US012810789B2

(12) United States Patent
Kim

(10) Patent No.: US 12,810,789 B2
(45) Date of Patent: Nov. 24, 2026

(54) IMAGE DISPLAY APPARATUS OUTPUTTING DISPLAY DRIVING VOLTAGES OF DIFFERING LEVELS

(71) Applicant: LG ELECTRONICS INC., Seoul (KR)

(72) Inventor: Kyungmin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 150 days.

(21) Appl. No.: 18/816,381

(22) Filed: Aug. 27, 2024

(65) Prior Publication Data

US 2025/0095567 A1 Mar. 20, 2025

(30) Foreign Application Priority Data

Sep. 15, 2023 (KR) ........................ 10-2023-0122833

(51) Int. Cl.
*G09G 3/3225* (2016.01)
*G09G 3/20* (2006.01)
*H02M 1/00* (2007.01)

(52) U.S. Cl.
CPC ......... *G09G 3/3225* (2013.01); *G09G 3/2003* (2013.01); *H02M 1/0025* (2021.05);
(Continued)

(58) Field of Classification Search
CPC ......... G09G 3/2003; G09G 3/30–3291; G09G 2300/0876; G09G 2310/0243; G09G 2330/021–025; G09G 2330/028–045; G09G 2360/16; G06F 1/32–3206; G06F 1/3296; H02M 1/0003–0019;
(Continued)

(56) References Cited

U.S. PATENT DOCUMENTS

2014/0049119 A1 2/2014 Lee
2014/0354168 A1* 12/2014 Hyeon ................ G09G 3/3406
345/212

(Continued)

FOREIGN PATENT DOCUMENTS

KR 20170015843 2/2017

OTHER PUBLICATIONS

European Patent Office Application Serial No. 24200314.3, Search Report dated Jan. 16, 2025, 15 pages.

(Continued)

*Primary Examiner* — Keith L Crawley
(74) *Attorney, Agent, or Firm* — LEE, HONG, DEGERMAN, KANG & WAIMEY

(57) ABSTRACT

The present disclosure relates to an image display apparatus. The image display apparatus according to an embodiment of the present disclosure includes: a display; a signal processing device configured to output an image signal to the display; and a power supply including a converter configured to supply a display driving voltage to the display, wherein the converter is configured to: output a display driving voltage of a first level based on a first mode; output a display driving voltage of a second level higher than the first level based on a second mode; and change a reference level for overcurrent protection based on the first mode or the second mode. Accordingly, heat generated by circuit elements in the converter may be reduced.

17 Claims, 18 Drawing Sheets

(52) U.S. Cl.
CPC ............... *G09G 2300/0876* (2013.01); *G09G 2330/021* (2013.01); *G09G 2330/025* (2013.01); *G09G 2330/045* (2013.01)

(58) Field of Classification Search
CPC ............... H02M 1/0025; H02M 1/322; H02M 3/01–015; H02M 3/156–1566
See application file for complete search history.

(56) References Cited

U.S. PATENT DOCUMENTS

| | | | | |
|---|---|---|---|---|
| 2017/0294844 | A1* | 10/2017 | Nishijima | H02M 3/33571 |
| 2019/0221189 | A1* | 7/2019 | Keller | G06F 1/3296 |
| 2020/0152121 | A1* | 5/2020 | Sung | G09G 3/3225 |
| 2021/0049954 | A1* | 2/2021 | Lee | G09G 3/3406 |
| 2021/0256904 | A1* | 8/2021 | Kang | G09G 3/3225 |
| 2021/0407361 | A1* | 12/2021 | Jang | H02M 7/06 |
| 2022/0215803 | A1* | 7/2022 | Pyun | G09G 3/3258 |
| 2022/0254300 | A1* | 8/2022 | Pyun | G09G 3/3233 |
| 2023/0119541 | A1* | 4/2023 | Chen | H02M 1/32<br>363/15 |
| 2023/0230518 | A1* | 7/2023 | Baek | G09G 3/20<br>345/211 |
| 2024/0428742 | A1* | 12/2024 | Pyun | G09G 3/3275 |

OTHER PUBLICATIONS

Basso, "Control Methods of LLC Converters," XP093236690, Future Electronics, Jul. 2023, 16 pages.
Anonymous, "NCP13992," XP093236695, ON Semiconductor, May 2019, 30 pages.

* cited by examiner

| Voltage | Trans temperature |
|---|---|
| 24V | 125℃ |
| 22V | 140℃ |
| 20V | 150℃ |

IMAGE DISPLAY APPARATUS OUTPUTTING DISPLAY DRIVING VOLTAGES OF DIFFERING LEVELS

CROSS-REFERENCE TO RELATED APPLICATIONS

Pursuant to 35 U.S.C. § 119(a), this application claims the benefit of earlier filing date and right of priority to Korean Patent Application No. 10-2023-0122833, filed on Sep. 15, 2023, the contents of which are all hereby incorporated by reference herein in their entireties.

BACKGROUND

1. Field

The present disclosure relates to an image display apparatus, and more particularly to an image display apparatus capable of reducing heat generated by circuit elements in the converter.

2. Description of the Related Art

An image display apparatus is an apparatus that displays images.

Recently, in keeping with the increase in image resolution and the increase in image sharpness, the display resolution or peak luminance of a display in an image display apparatus is increasing.

As the display resolution or peak luminance of a display becomes higher, the consumption of power supplied to the display increases.

Meanwhile, circuit elements in a power supply that supplies power to the display have reliability issues in that when the level of a display driving voltage changes, heat generated in the circuit elements increases due to overcurrent and the like.

SUMMARY

It is an objective of the present disclosure to provide an image display apparatus capable of reducing heat generated by circuit elements in a converter.

It is another objective of the present disclosure to provide an image display apparatus capable of reducing heat generated by a transformer in a converter.

It is yet another objective of the present disclosure to provide an image display apparatus capable of reducing heat generated by circuit elements in a converter even when the level of a display driving voltage changes.

In order to achieve the above and other objectives, an image display apparatus according to an embodiment of the present disclosure includes: a display; a signal processing device configured to output an image signal to the display; and a power supply including a converter configured to supply a display driving voltage to the display, wherein the converter is configured to: output a display driving voltage of a first level based on a first mode; output a display driving voltage of a second level higher than the first level based on a second mode; and change a reference level for overcurrent protection based on the first mode or the second mode.

Meanwhile, a first reference level for overcurrent protection in the first mode may be lower than a second reference level for overcurrent protection in the second mode.

Meanwhile, the converter may include: a transformer: a first switching element and a second switching element disposed at an input terminal of the transformer and connected in series with each other; a resonant capacitor and a resonant inductor disposed between and respectively connected to the input terminal of the transformer and the second switching element; and a switching controller configured to control the first switching element and the second switching element, wherein the switching controller may be configured to change a reference level for overcurrent protection based on the first mode or the second mode.

Meanwhile, the switching controller may be configured to control the first reference level for overcurrent protection in the first mode to be lower than the second reference level for overcurrent protection in the second mode.

Meanwhile, the switching controller may be configured to: in the first mode, in response to a current flowing through the resonant inductor being higher than or equal to the first reference level, control the first switching element and the second switching element to stop a switching operation; and in the second mode, in response to a current flowing through the resonant inductor being higher than or equal to the second reference level which is higher than the first reference level, control the first switching element and the second switching element to stop a switching operation.

Meanwhile, the switching controller may be configured to: in the first mode, in response to a current flowing through the resonant inductor being a first current at a level higher than or equal to the first reference level, control the first switching element and the second switching element to stop a switching operation; and in the second mode, in response to a current flowing through the resonant inductor being the first current at a level between the first reference level and the second reference level higher than the first reference level, control the first switching element or the second switching element to perform a switching operation.

Meanwhile, the switching controller may be configured to: in the first mode, in response to a current flowing through the resonant inductor being higher than or equal to the first reference level, control the first switching element and the second switching element to stop a switching operation for a first period of time; and in the second mode, in response to a current flowing through the resonant inductor being higher than or equal to the second reference level which is higher than the first reference level, control the first switching element and the second switching element to stop a switching operation for a second period of time which is longer than the first period of time.

Meanwhile, the converter may further include a current detector configured to detect the current flowing through the resonant inductor.

Meanwhile, the converter may further include a voltage detector configured to detect the display driving voltage output from an output terminal of the transformer, wherein the switching controller is configured to change the reference level for overcurrent protection based on a level of the display driving voltage from the voltage detector.

Meanwhile, the switching controller may be configured to: in response to a level of the display driving voltage from the voltage detector corresponding to the first level, set the first reference level for overcurrent protection; and in response to a level of the display driving voltage from the voltage detector corresponding to the second level, set the second reference level for overcurrent protection which is higher than the first reference level.

Meanwhile, the converter may be configured to output a display driving voltage of a third level based on a third mode, wherein the converter may be configured to change the reference level for overcurrent protection based on the first mode, the second mode, or the third mode.

Meanwhile, the second reference level for overcurrent protection in the second mode may be lower than a third reference level for overcurrent protection in the third mode.

Meanwhile, the converter may include: a transformer; a first switching element and a second switching element disposed at an input terminal of the transformer and connected in series with each other; a resonant capacitor and a resonant inductor disposed between and respectively connected to the input terminal of the transformer and the second switching element; and a switching controller configured to control the first switching element and the second switching element, wherein the switching controller may be configured to change a reference level for overcurrent protection based on the first mode, the second mode, or the third mode.

Meanwhile, the switching controller may be configured to control the second reference level for overcurrent protection in the second mode to be lower than the third reference level for overcurrent protection in the third mode.

Meanwhile, the switching controller may be configured to: in the first mode, in response to a current flowing through the resonant inductor being higher than or equal to the first reference level, control the first switching element and the second switching element to stop a switching operation; in the second mode, in response to a current flowing through the resonant inductor being higher than or equal to the second reference level which is higher than the first reference level, control the first switching element and the second switching element to stop a switching operation; and in the third mode, in response to a current flowing through the resonant inductor being higher than or equal to the third reference level which is higher than the second reference level, control the first switching element and the second switching element to stop a switching operation.

Meanwhile, the switching controller may be configured to: in the first mode, in response to a current flowing through the resonant inductor being a first current at a level higher than or equal to the first reference level, control the first switching element and the second switching element to stop a switching operation; and in the second mode, in response to a current flowing through the resonant inductor being the first current at a level between the first reference level and the second reference level higher than the first reference level, control the first switching element or the second switching element to perform a switching operation.

Meanwhile, the switching controller may be configured to: in the second mode, in response to a current flowing through the resonant inductor being a second current at a level higher than or equal to the first reference level, control the first switching element and the second switching element to stop a switching operation; in the third mode, in response to a current flowing through the resonant inductor being the second current at a level between the second reference level and the third reference level higher than the second reference level, control the first switching element or the second switching element to perform a switching operation.

Meanwhile, the converter may further include a voltage detector configured to detect the display driving voltage output from an output terminal of the transformer; and a reference level changing part configured to change a reference level based on the display driving voltage from the voltage detector, wherein the reference level changing part may include: a first capacitor and a second capacitor which are connected in parallel with each other; and a switching element connected to either the first capacitor or the second capacitor.

Meanwhile, the converter may be configured to: in the first mode, in response to a current flowing through the resonant inductor being a first current at a level higher than or equal to the first reference level, control the first switching element and the second switching element to stop a switching operation; and in the second mode, in response to a current flowing through the resonant inductor being the first current at a level between the first reference level and the second reference level higher than the first reference level, control the switching element in the converter to perform a switching operation.

In order to achieve the above and other objectives, an image display apparatus according to another embodiment of the present disclosure includes: a display; a signal processing device configured to output an image signal to the display; and a power supply including a converter configured to supply a display driving voltage to the display, wherein the converter is configured to: in a first mode in which a display driving voltage of a first level is output, in response to a current flowing through a resonant inductor in the converter being a first current at a level higher than or equal to a first reference level, control the switching element in the converter to stop a switching operation; and in a second mode in which a display driving voltage of a second level higher than the first level is output, in response to a current of the resonant inductor being the first current at a level between the first reference level and a second reference level higher than the first reference level, control the switching element in the converter to perform a switching operation.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Hereinafter, the present disclosure will be described in detail with reference to the accompanying drawings.

Regarding constituent elements used in the following description, suffixes "module" and "unit" are given only in consideration of ease in the preparation of the specification, and do not have or serve as different meanings. Accordingly, the suffixes "module" and "unit" may be used interchangeably.

Figure 1:
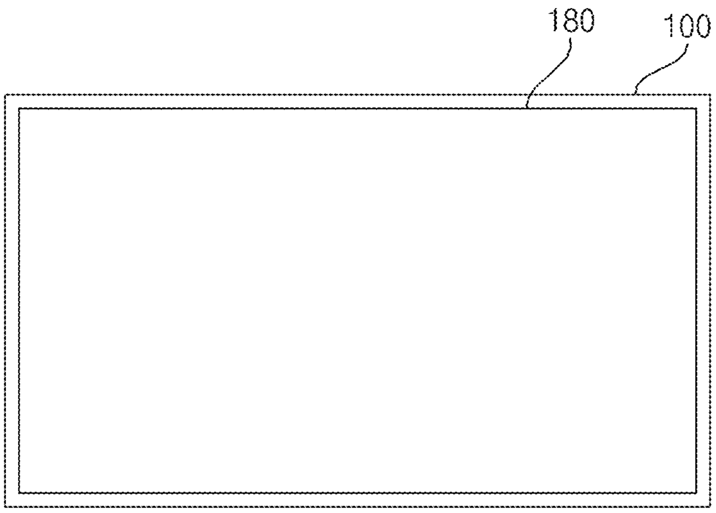
FIG. 1 is a diagram showing an image display apparatus according to an embodiment of the present disclosure.

FIG. 1 is a diagram showing an image display apparatus according to an embodiment of the present disclosure.

Referring to the figure, an image display apparatus 100 may include a display 180.

The display resolution of the display 180 is getting higher and higher from 2K to 4K to 8K to 16K and higher, and the peak luminance of the display 180 is also increasing. Accordingly, the consumption of power supplied to the display 180 becomes higher.

Meanwhile, the display 180 may be implemented by one of various panels. For example, the display 180 may be one of a liquid crystal display panel (LCD panel), an organic light-emitting panel (OLED panel), and an inorganic light-emitting panel (LED panel).

The liquid crystal display panel may require a backlight in addition to a panel for image display.

On the other hand, the organic light-emitting panel or the inorganic light-emitting panel requires no backlight for image display.

A power supply 190 (see FIG. 2) in the image display apparatus 100 according to an embodiment of the present disclosure outputs various levels of display driving voltages according to a display mode of the display 180 and the like.

Meanwhile, when various levels of display driving voltages are output, an overcurrent may flow, which increases heat generation in circuit elements.

Accordingly, the image display apparatus 100 according to an embodiment of the present disclosure proposes a method of reducing heat generation in internal circuit elements even when the level of a display driving voltage changes.

To this end, the image display apparatus according to an embodiment of the present disclosure includes a display 180, a signal processing device 170 (see FIG. 2) configured to output an image signal to the display 180, and a power supply 190 (see FIG. 2) configured to supply a display driving voltage to the display 180.

Meanwhile, the power supply 190 according to an embodiment of the present disclosure outputs a display driving voltage of a first level LV1 based on a first mode, outputs a display driving voltage of a second level LV2, higher than the first level LV1, based on a second mode, and varies a reference level for overcurrent protection based on the first mode or the second mode. Accordingly, heat generated by the circuit elements in a converter 910 may be reduced. Particularly, even when the level of a display driving voltage Vdd changes, heat generated by the circuit elements in the converter 910 may be reduced.

Meanwhile, the image display apparatus 100 of FIG. 1 may be a TV, a monitor, a vehicle display device, a tablet PC, a mobile terminal, and the like.

Figure 2:
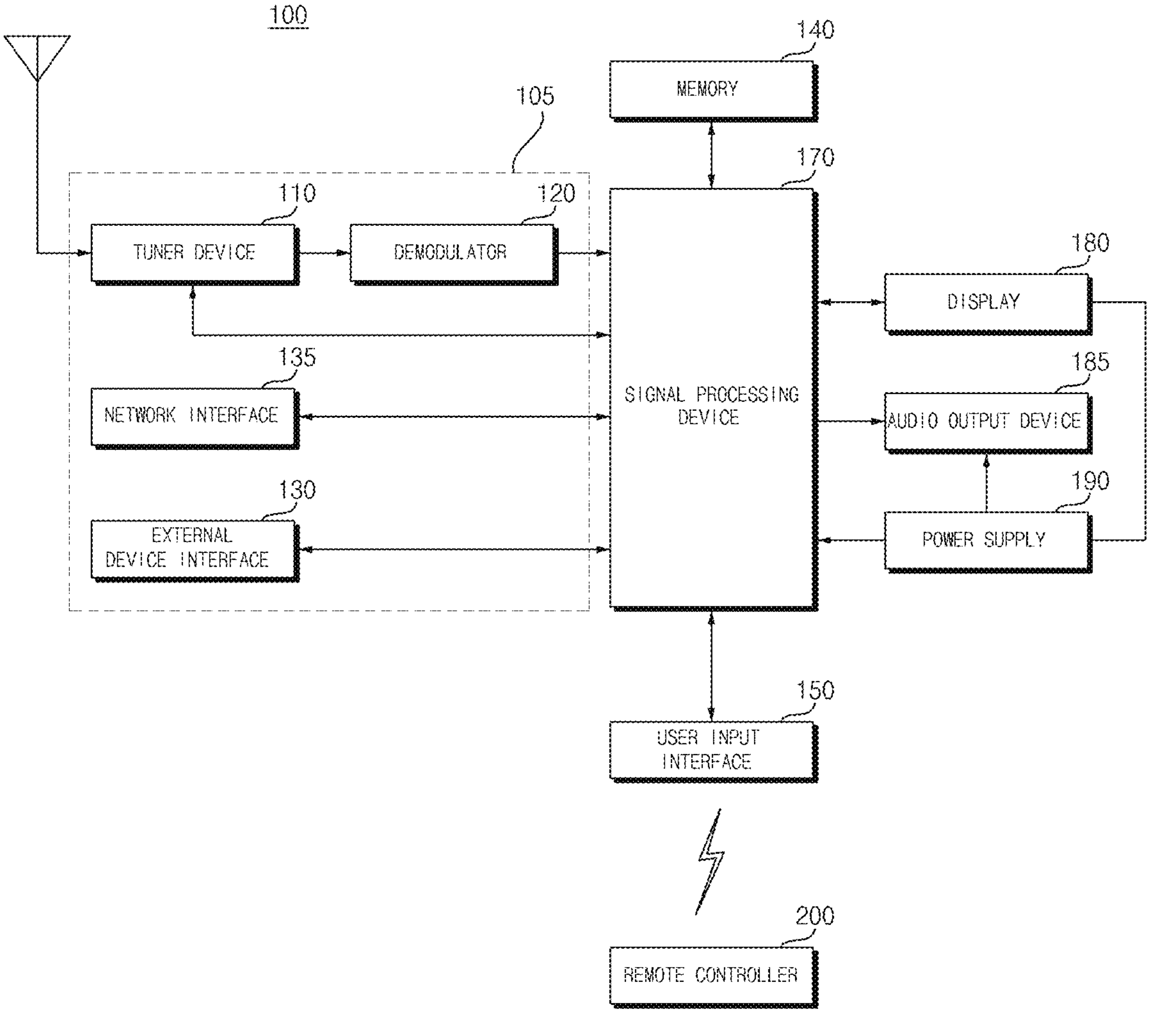
FIG. 2 is an example of an internal block diagram of the image display apparatus.

FIG. 2 is an example of an internal block diagram of the image display apparatus of FIG. 1.

Referring to FIG. 2, the image display apparatus 100 according to an embodiment of the present disclosure includes an image receiver 105, an external apparatus interface 130, a memory 140, a user input interface 150, a sensor device (not shown), a signal processing device 170, a display 180, and an audio output device 185.

The image receiver 105 may include a tuner 110, a demodulator 120, a network interface 135, and an external apparatus interface 130.

Meanwhile, unlike the figure, the image receiver 105 may include only the tuner 110, the demodulator 120, and the external apparatus interface 130. That is, the network interface 135 may not be included.

The tuner 110 selects an RF broadcast signal corresponding to a channel selected by a user or all pre-stored channels among radio frequency (RF) broadcast signals received through an antenna (not shown). In addition, the selected RF broadcast signal is converted into an intermediate frequency signal, a baseband image, or an audio signal.

For example, if the selected RF broadcast signal is a digital broadcast signal, the tuner 110 converts the digital broadcast signal into a digital IF (DIF) signal and, if the selected RF broadcast signal is an analog broadcast signal, the tuner 110 converts the analog broadcast signal into an analog baseband image or voice (CVBS/SIF) signal. That is, the tuner 110 may process a digital broadcast signal or an analog broadcast signal. The analog baseband image or voice (CVBS/SIF) signal output from the tuner 110 may be directly input to the signal processing device 170.

Meanwhile, the tuner 110 may include a plurality of tuners for receiving broadcast signals of a plurality of channels. Alternatively, a single tuner that simultaneously receives broadcast signals of a plurality of channels is also available.

The demodulator 120 receives the converted digital IF signal DIF from the tuner 110 and performs a demodulation operation.

The demodulator 120 may perform demodulation and channel decoding and then output a stream signal TS. At this time, the stream signal may be a multiplexed signal of an image signal, an audio signal, or a data signal.

The stream signal output from the demodulator 120 may be input to the signal processing device 170. The signal processing device 170 performs demultiplexing, image/audio signal processing, and the like, and then outputs an image to the display 180 and outputs audio to the audio output device 185.

The external apparatus interface 130 may transmit or receive data with a connected external apparatus (not shown), e.g., a set-top box 50. To this end, the external apparatus interface 130 may include an A/V input and output device (not shown).

The external apparatus interface 130 may be connected in wired or wirelessly to an external apparatus, such as a digital versatile disk (DVD), a Blu ray, a game equipment, a camera, a camcorder, a computer (note book), and a set-top box, and may perform an input/output operation with an external apparatus.

The A/V input and output device may receive image and audio signals from an external apparatus. Meanwhile, a wireless transceiver (not shown) may perform short-range wireless communication with other electronic apparatus.

Through the wireless transceiver (not shown), the external apparatus interface 130 may exchange data with an adjacent mobile terminal 600. In particular, in a mirroring mode, the external apparatus interface 130 may receive device information, executed application information, application image, and the like from the mobile terminal 600.

The network interface 135 provides an interface for connecting the image display apparatus 100 to a wired/wireless network including the Internet network. For example, the network interface 135 may receive, via the network, content or data provided by the Internet, a content provider, or a network operator.

Meanwhile, the network interface 135 may include a wireless transceiver (not shown).

The memory 140 may store a program for each signal processing and control in the signal processing device 170, and may store signal-processed image, audio, or data signal.

In addition, the memory 140 may serve to temporarily store image, audio, or data signal input to the external apparatus interface 130. In addition, the memory 140 may store information on a certain broadcast channel through a channel memory function, such as a channel map.

Although FIG. 2 illustrates that the memory is provided separately from the signal processing device 170, the scope of the present disclosure is not limited thereto. The memory 140 may be included in the signal processing device 170.

The user input interface 150 transmits a signal input by the user to the signal processing device 170 or transmits a signal from the signal processing device 170 to the user.

For example, it may transmit/receive a user input signal, such as power on/off, channel selection, screen setting, etc., from a remote controller 200, may transfer a user input signal input from a local key (not shown), such as a power key, a channel key, a volume key, a set value, etc., to the signal processing device 170, may transfer a user input signal input from a sensor device (not shown) that senses a user's gesture to the signal processing device 170, or may transmit a signal from the signal processing device 170 to the sensor device (not shown).

The signal processing device 170 may demultiplex the input stream through the tuner 110, the demodulator 120, the network interface 135, or the external apparatus interface 130, or process the demultiplexed signals to generate and output a signal for image or audio output.

For example, the signal processing device 170 receives a broadcast signal received by the image receiver 105 or an HDMI signal, and perform signal processing based on the received broadcast signal or the HDMI signal to thereby output a processed image signal.

The image signal processed by the signal processing device 170 is input to the display 180, and may be displayed as an image corresponding to the image signal. In addition, the image signal processed by the signal processing device 170 may be input to the external output apparatus through the external apparatus interface 130.

The audio signal processed by the signal processing device 170 may be output to the audio output device 185 as an audio signal. In addition, audio signal processed by the signal processing device 170 may be input to the external output apparatus through the external apparatus interface 130.

Although not shown in FIG. 2, the signal processing device 170 may include a demultiplexer, an image processor, and the like. That is, the signal processing device 170 may perform a variety of signal processing and thus it may be implemented in the form of a system on chip (SOC). This will be described later with reference to FIG. 3.

In addition, the signal processing device 170 may control the overall operation of the image display apparatus 100. For example, the signal processing device 170 may control the tuner 110 to control the tuning of the RF broadcast corresponding to the channel selected by the user or the previously stored channel.

In addition, the signal processing device 170 may control the image display apparatus 100 according to a user command input through the user input interface 150 or an internal program.

Meanwhile, the signal processing device 170 may control the display 180 to display an image. At this time, the image displayed on the display 180 may be a still image or a moving image, and may be a 2D image or a 3D image.

Meanwhile, the signal processing device 170 may display a certain object in an image displayed on the display 180. For example, the object may be at least one of a connected web screen (newspaper, magazine, etc.), an electronic program guide (EPG), various menus, a widget, an icon, a still image, a moving image, and a text.

Meanwhile, the signal processing device 170 may recognize the position of the user based on the image photographed by a photographing device (not shown). For example, the distance (z-axis coordinate) between a user and the image display apparatus 100 may be determined. In addition, the x-axis coordinate and the y-axis coordinate in the display 180 corresponding to a user position may be determined.

The display 180 generates a driving signal by converting an image signal, a data signal, an OSD signal, a control signal processed by the signal processing device 170, an image signal, a data signal, a control signal, and the like received from the external apparatus interface 130.

Meanwhile, the display 180 may be configured as a touch screen and used as an input device in addition to an output device.

The audio output device 185 receives a signal processed by the signal processing device 170 and outputs it as an audio.

The photographing device (not shown) photographs a user. The photographing device (not shown) may be implemented by a single camera, but the present disclosure is not limited thereto and may be implemented by a plurality of cameras. Image information photographed by the photographing device (not shown) may be input to the signal processing device 170.

The signal processing device 170 may sense a gesture of the user based on each of the images photographed by the photographing device (not shown), the signals detected from the sensor device (not shown), or a combination thereof.

The power supply 190 supplies corresponding power to the image display apparatus 100. Particularly, the power may be supplied to a signal processing device 170 which may be implemented in the form of a system on chip (SOC), a display 180 for displaying an image, and an audio output device 185 for outputting an audio.

Specifically, the power supply 190 may include a converter to convert an AC power into a DC voltage, and a DC/DC converter to convert the level of the DC voltage.

The remote controller 200 transmits the user input to the user input interface 150. To this end, the remote controller 200 may use Bluetooth, a radio frequency (RF) communication, an infrared (IR) communication, an Ultra Wideband (UWB), ZigBee, or the like. In addition, the remote controller 200 may receive the image, audio, or data signal output from the user input interface 150, and display it on the remote controller 200 or output it as an audio.

Meanwhile, the image display apparatus 100 may be a fixed or mobile digital broadcast receiver capable of receiving digital broadcast.

Meanwhile, a block diagram of the image display apparatus 100 shown in FIG. 2 is a block diagram for an embodiment of the present disclosure. Each component of the block diagram may be integrated, added, or omitted according to a specification of the image display apparatus 100 actually implemented. That is, two or more components may be combined into a single component as needed, or a single component may be split into two or more components. The function performed in each block is described for the purpose of illustrating embodiments of the present disclosure, and specific operation and apparatus do not limit the scope of the present disclosure.

Figure 3:
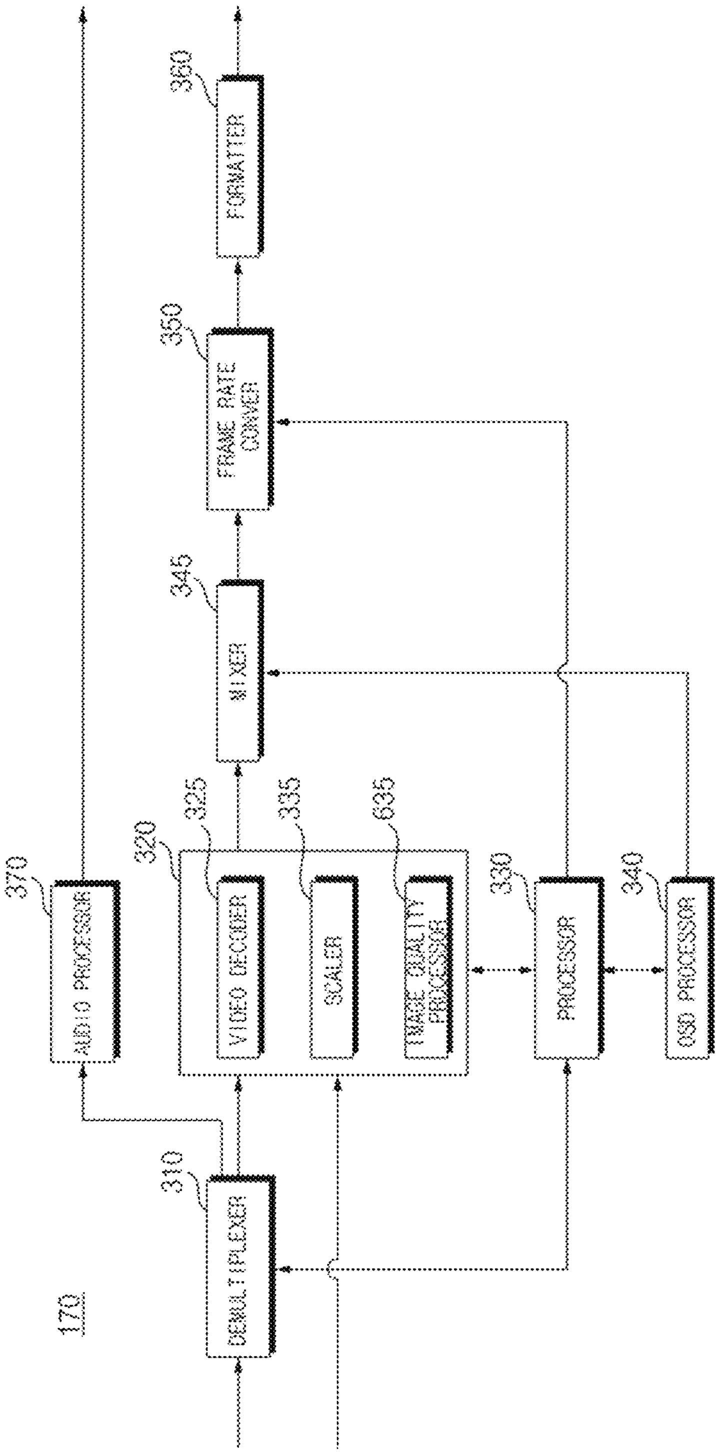
FIG. 3 is an example of an internal block diagram of a signal processing device of FIG. 2.

FIG. 3 is an example of an internal block diagram of the signal processing device in FIG. 2.

Referring to the figure, the signal processing device 170 according to an embodiment of the present disclosure may include a demultiplexer 310, an image processor 320, a processor 330, and an audio processor 370. In addition, the signal processing device 170 may further include and a data processor (not shown).

The demultiplexer 310 demultiplexes the input stream. For example, when an MPEG-2 TS is input, it may be demultiplexed into image, audio, and data signal, respectively. Here, the stream signal input to the demultiplexer 310 may be a stream signal output from the tuner 110, the demodulator 120, or the external apparatus interface 130.

The image processor 320 may perform signal processing on an input image. For example, the image processor 320 may perform image processing on an image signal demultiplexed by the demultiplexer 310.

To this end, the image processor 320 may include an image decoder 325, a scaler 335, an image quality processor 635, an image encoder (not shown), an OSD processor 340, a frame rate converter 350, a formatter 360, etc.

The image decoder 325 decodes a demultiplexed image signal, and the scaler 335 performs scaling so that the resolution of the decoded image signal may be output from the display 180.

The image decoder 325 may include a decoder of various standards. For example, a 3D image decoder for MPEG-2, H.264 decoder, a color image, and a depth image, and a decoder for a multiple view image may be provided.

The scaler 335 may scale an input image signal decoded by the image decoder 325 or the like.

For example, if the size or resolution of an input image signal is small, the scaler 335 may upscale the input image signal, and, if the size or resolution of the input image signal is great, the scaler 335 may downscale the input image signal.

The image quality processor 635 may perform image quality processing on an input image signal decoded by the image decoder 325 or the like.

For example, the image quality processor 635 may perform noise reduction processing on an input image signal, extend a resolution of high gray level of the input image signal, perform image resolution enhancement, perform high dynamic range (HDR)-based signal processing, change a frame rate, perform image quality processing suitable for properties of a panel, especially an OLED panel, etc.

The OSD processor 340 generates an OSD signal according to a user input or by itself. For example, based on a user input signal, the OSD processor 340 may generate a signal for displaying various information as a graphic or a text on the screen of the display 180. The generated OSD signal may include various data, such as a user interface screen of the image display apparatus 100, various menu screens, a widget, and an icon. In addition, the generated OSD signal may include a 2D object or a 3D object.

In addition, the OSD processor 340 may generate a pointer that may be displayed on the display, based on a pointing signal input from the remote controller 200. In particular, such a pointer may be generated by a pointing signal processing device, and the OSD processor 340 may include such a pointing signal processing device (not shown). Obviously, the pointing signal processing device (not shown) may be provided separately from the OSD processor 340.

The frame rate converter (FRC) 350 may convert a frame rate of an input image. Meanwhile, the frame rate converter 350 may output the input image without converting the frame rate.

Meanwhile, the formatter 360 may change a format of an input image signal into a format suitable for displaying the image signal on a display and output the image signal in the changed format.

In particular, the formatter 360 may change a format of an image signal to correspond to a display panel.

Further, the formatter 360 may convert the format of an image signal. For example, the formatter 360 may convert the format of a 3D image signal into one of various 3D formats, including a side-by-side format, a top/down format, a frame sequential format, an interlaced format, a checker box format, etc.

The processor 330 may control overall operations of the image display apparatus 100 or the signal processing device 170.

For example, the processor 330 may control the tuner 110 to control the tuning of an RF broadcast corresponding to a channel selected by a user or a previously stored channel.

In addition, the processor 330 may control the image display apparatus 100 according to a user command input through the user input interface 150 or an internal program.

In addition, the processor 330 may transmit data to the network interface 135 or to the external apparatus interface 130.

In addition, the processor 330 may control the demultiplexer 310, the image processor 320, and the like in the signal processing device 170.

Meanwhile, the audio processor 370 in the signal processing device 170 may perform the audio processing of the demultiplexed audio signal. To this end, the audio processor 370 may include various decoders.

In addition, the audio processor 370 in the signal processing device 170 may process a base, a treble, a volume control, and the like.

The data processor (not shown) in the signal processing device 170 may perform data processing of the demultiplexed data signal. For example, when the demultiplexed data signal is a coded data signal, it may be decoded. The encoded data signal may be electronic program guide information including broadcast information, such as a start time and an end time of a broadcast program broadcasted on each channel.

Meanwhile, a block diagram of the signal processing device 170 shown in FIG. 3 is a block diagram for an embodiment of the present disclosure. Each component of the block diagram may be integrated, added, or omitted according to a specification of the signal processing device 170 actually implemented.

In particular, the frame rate converter 350 and the formatter 360 may be provided separately in addition to the image processor 320.

Figure 4A:
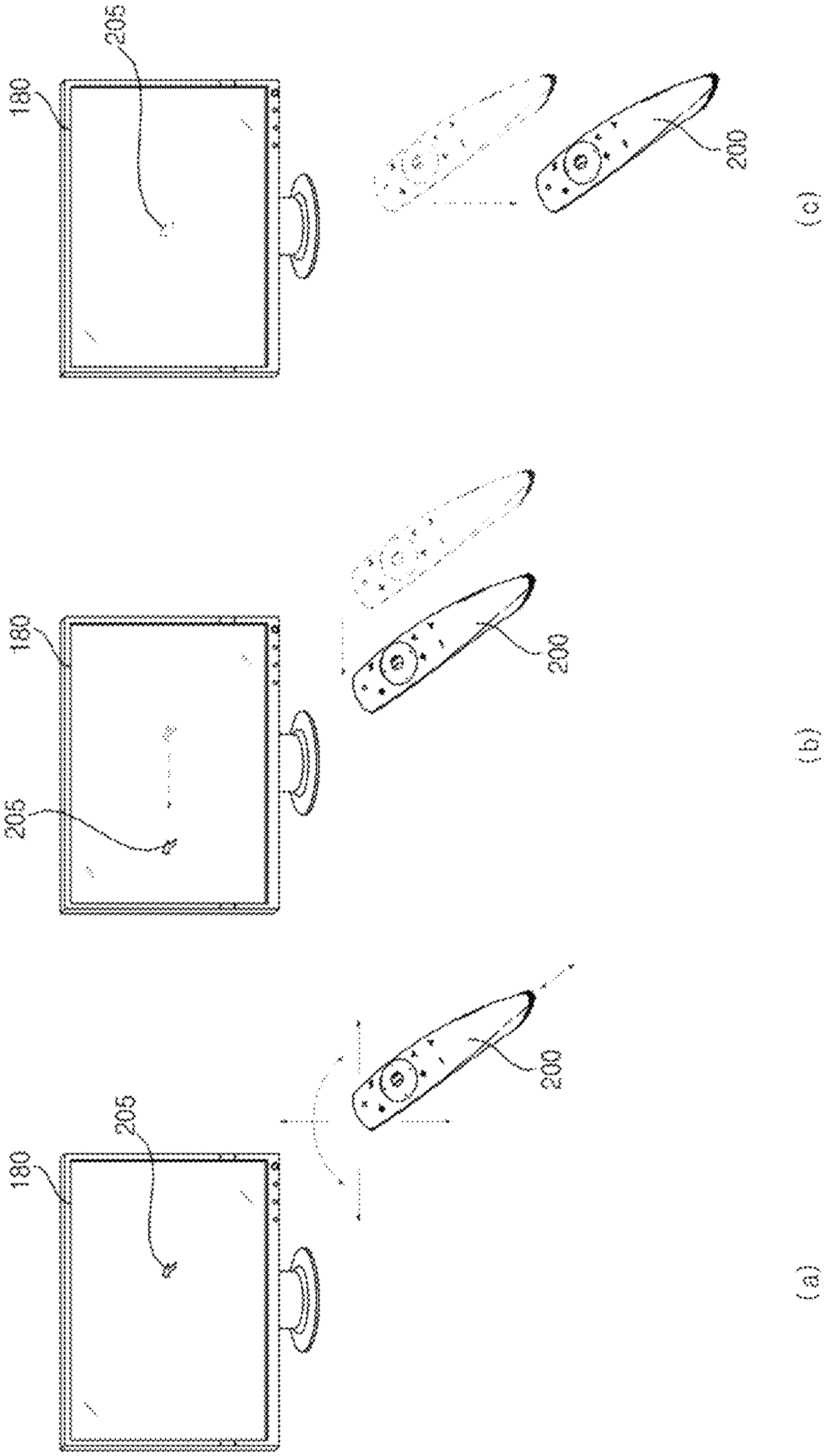
FIG. 4A is a diagram showing a method of controlling a remote controller of FIG. 2.

FIG. 4A is a diagram illustrating a control method of a remote controller of FIG. 2.

As shown in FIG. 4A(a), it is illustrated that a pointer 205 corresponding to the remote controller 200 is displayed on the display 180.

The user may move or rotate the remote controller 200 up and down, left and right (FIG. 4A(b)), and back and forth (FIG. 4A(c)). The pointer 205 displayed on the display 180 of the image display apparatus corresponds to the motion of the remote controller 200. Such a remote controller 200 may be referred to as a space remote controller or a 3D pointing apparatus, because the pointer 205 is moved and displayed according to the movement in a 3D space, as shown in the figure.

FIG. 4A(b) illustrates that when the user moves the remote controller 200 to the left, the pointer 205 displayed on the display 180 of the image display apparatus also moves to the left correspondingly.

Information on the motion of the remote controller 200 detected through a sensor of the remote controller 200 is transmitted to the image display apparatus. The image display apparatus may calculate the coordinate of the pointer 205 from the information on the motion of the remote controller 200. The image display apparatus may display the pointer 205 to correspond to the calculated coordinate.

FIG. 4A(c) illustrates a case where the user moves the remote controller 200 away from the display 180, while pressing a specific button of the remote controller 200. Thus, a selection area within the display 180 corresponding to the pointer 205 may be zoomed in so that it may be displayed to be enlarged. Meanwhile, when the user moves the remote controller 200 close to the display 180, the selection area within the display 180 corresponding to the pointer 205 may be zoomed out so that it may be displayed to be reduced. Meanwhile, when the remote controller 200 moves away from the display 180, the selection area may be zoomed out, and when the remote controller 200 approaches the display 180, the selection area may be zoomed in.

Meanwhile, when the specific button of the remote controller 200 is pressed, it is possible to exclude the recognition of vertical and lateral movement. That is, when the remote controller 200 moves away from or approaches the display 180, the up, down, left, and right movements are not recognized, and only the forward and backward movements are recognized. Only the pointer 205 is moved according to the up, down, left, and right movements of the remote controller 200 in a state where the specific button of the remote controller 200 is not pressed.

Meanwhile, the moving speed or the moving direction of the pointer 205 may correspond to the moving speed or the moving direction of the remote controller 200.

Figure 4B:
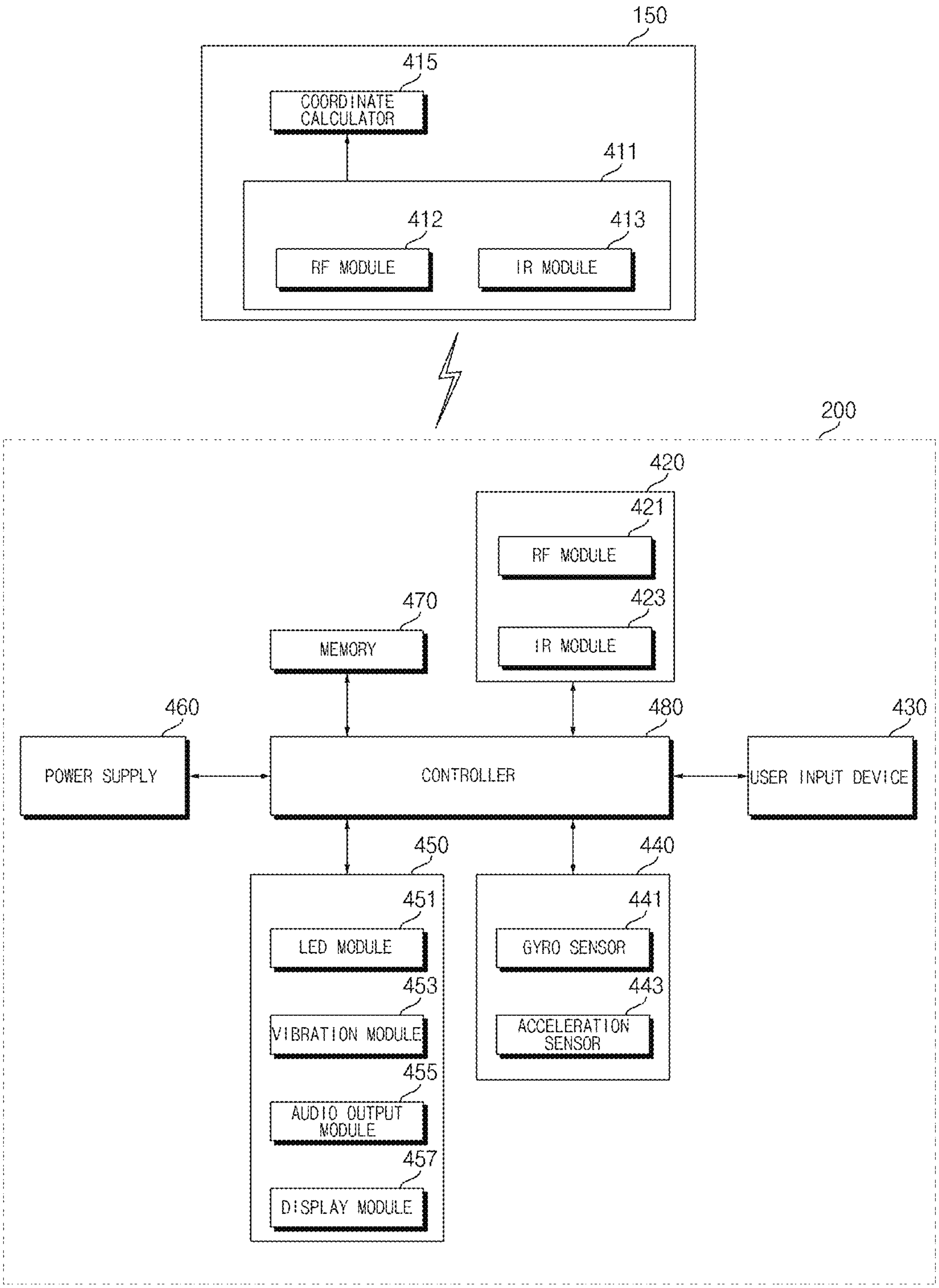
FIG. 4B is an internal block diagram of the remote controller of FIG. 2.

FIG. 4B is an internal block diagram of the remote controller of FIG. 2.

Referring to the figure, the remote controller 200 includes a wireless transceiver 425, a user input device 435, a sensor device 440, an output device 450, a power supply 460, a memory 470, and a controller 480.

The wireless transceiver 425 transmits/receives a signal to/from any one of the image display apparatuses according to the embodiments of the present disclosure described above. Among the image display apparatuses according to the embodiments of the present disclosure, one image display apparatus 100 will be described as an example.

In the present embodiment, the remote controller 200 may include an RF module 421 for transmitting and receiving signals to and from the image display apparatus 100 according to a RF communication standard. In addition, the remote controller 200 may include an IR module 423 for transmitting and receiving signals to and from the image display apparatus 100 according to an IR communication standard.

In the present embodiment, the remote controller 200 transmits a signal containing information on the motion of the remote controller 200 to the image display apparatus 100 through the RF module 421.

In addition, the remote controller 200 may receive the signal transmitted by the image display apparatus 100 through the RF module 421. In addition, if necessary, the remote controller 200 may transmit a command related to power on/off, channel change, volume change, and the like to the image display apparatus 100 through the IR module 423.

The user input device 435 may be implemented by a keypad, a button, a touch pad, a touch screen, or the like. The user may operate the user input device 435 to input a command related to the image display apparatus 100 to the remote controller 200. When the user input device 435 includes a hard key button, the user may input a command related to the image display apparatus 100 to the remote controller 200 through a push operation of the hard key button. When the user input device 435 includes a touch screen, the user may touch a soft key of the touch screen to input the command related to the image display apparatus 100 to the remote controller 200. In addition, the user input device 435 may include various types of input means, such as a scroll key, a jog key, etc., which may be operated by the user, and the present disclosure does not limit the scope of the present disclosure.

The sensor device 440 may include a gyro sensor 441 or an acceleration sensor 443. The gyro sensor 441 may sense information regarding the motion of the remote controller 200.

For example, the gyro sensor 441 may sense information on the operation of the remote controller 200 based on the x, y, and z axes. The acceleration sensor 443 may sense information on the moving speed of the remote controller 200. Meanwhile, a distance measuring sensor may be further provided, and thus, the distance to the display 180 may be sensed.

The output device 450 may output an image or an audio signal corresponding to the operation of the user input device 435 or a signal transmitted from the image display apparatus 100. Through the output device 450, the user may recognize whether the user input device 435 is operated or whether the image display apparatus 100 is controlled.

For example, the output device 450 may include an LED module 451 that is turned on when the user input device 435 is operated or a signal is transmitted/received to/from the image display apparatus 100 through the wireless transceiver 425, a vibration module 453 for generating a vibration, an audio output module 455 for outputting an audio, or a display module 457 for outputting an image.

The power supply 460 supplies power to the remote controller 200. When the remote controller 200 is not moved for a certain time, the power supply 460 may stop the supply of power to reduce a power waste. The power supply 460 may resume power supply when a certain key provided in the remote controller 200 is operated.

The memory 470 may store various types of programs, application data, and the like necessary for the control or operation of the remote controller 200. If the remote controller 200 wirelessly transmits and receives a signal to/from the image display apparatus 100 through the RF module 421, the remote controller 200 and the image display apparatus 100 transmit and receive a signal through a certain frequency band. The controller 480 of the remote controller 200 may store information regarding a frequency band or the like for wirelessly transmitting and receiving a signal to/from the image display apparatus 100 paired with the remote controller 200 in the memory 470 and may refer to the stored information.

The controller 480 controls various matters related to the control of the remote controller 200. The controller 480 may transmit a signal corresponding to a certain key operation of the user input device 435 or a signal corresponding to the motion of the remote controller 200 sensed by the sensor device 440 to the image display apparatus 100 through the wireless transceiver 425.

The user input interface 150 of the image display apparatus 100 includes a wireless transceiver 151 that may wirelessly transmit and receive a signal to and from the remote controller 200 and a coordinate value calculator 415 that may calculate the coordinate value of a pointer corresponding to the operation of the remote controller 200.

The user input interface 150 may wirelessly transmit and receive a signal to and from the remote controller 200 through the RF module 412. In addition, the user input interface 150 may receive a signal transmitted by the remote controller 200 through the IR module 413 according to an IR communication standard.

The coordinate value calculator 415 may correct a hand shake or an error from a signal corresponding to the operation of the remote controller 200 received through the wireless transceiver 151 and calculate the coordinate value (x, y) of the pointer 205 to be displayed on the display 180.

The transmission signal of the remote controller 200 inputted to the image display apparatus 100 through the user input interface 150 is transmitted to the controller 180 of the image display apparatus 100. The controller 180 may determine the information on the operation of the remote controller 200 and the key operation from the signal transmitted from the remote controller 200, and, correspondingly, control the image display apparatus 100.

For another example, the remote controller 200 may calculate the pointer coordinate value corresponding to the operation and output it to the user input interface 150 of the image display apparatus 100. In this case, the user input interface 150 of the image display apparatus 100 may transmit information on the received pointer coordinate value to the controller 180 without a separate correction process of hand shake or error.

For another example, unlike the figure, the coordinate value calculator 415 may be provided in the signal processing device 170, not in the user input interface 150.

Figure 5:
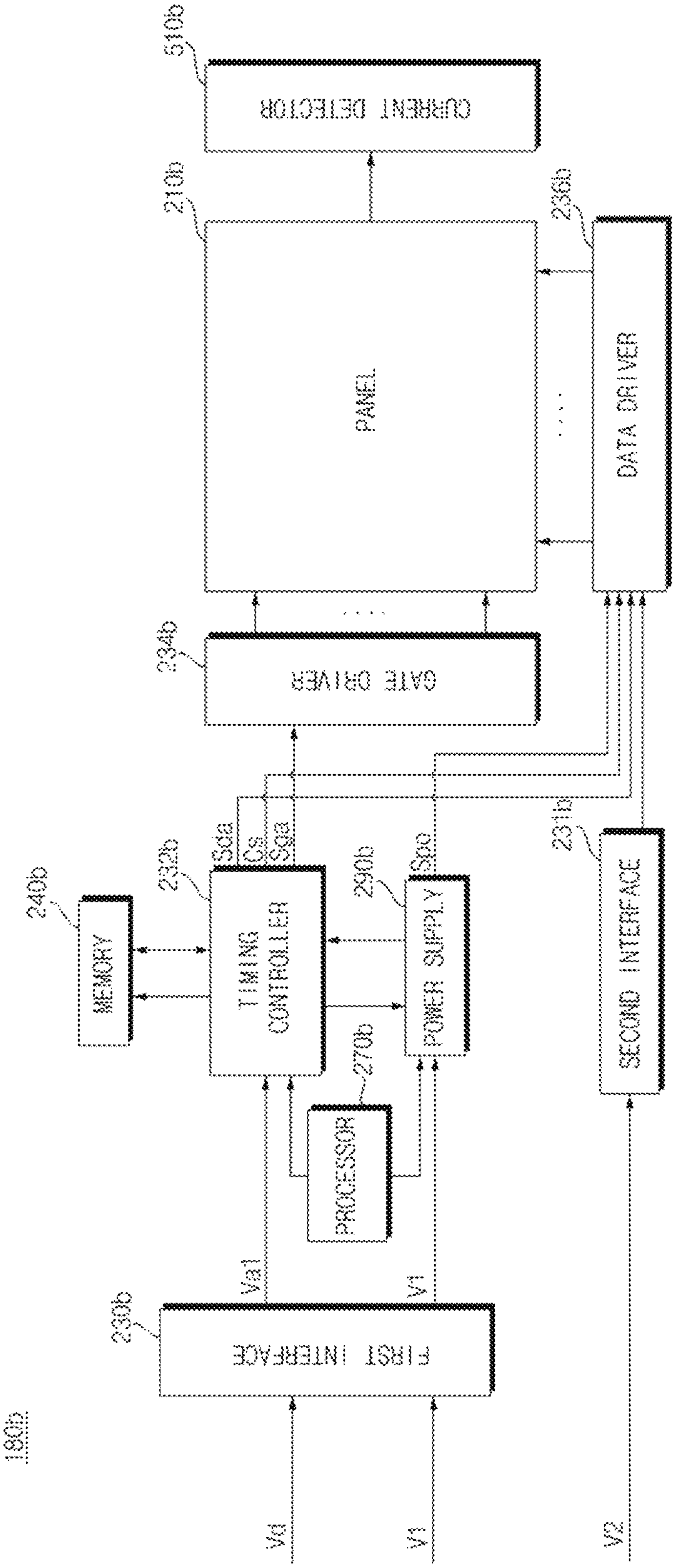
FIG. 5 is an exemplary internal block diagram of a display of FIG. 2.

FIG. 5 is an exemplary internal block diagram of a display of FIG. 2.

Referring to FIG. 5, an organic light-emitting panel-based display **180*b* may include an organic light-emitting panel 210*b*, a first interface 230*b*, a second interface 231*b*, a timing controller 232*b*, a gate driver 234*b*, a data driver 236*b*, a memory 240*b*, a processor 270*b*, a power supply 290*b*, a current detector 510*b***, and the like.

The display **180*b* receives an image signal Vdb, a first DC voltage V1***b*, and a second DC voltage V2*b*, and may display a certain image based on the image signal Vdb.

Meanwhile, the first interface **230*b* in the display 180*b* may receive the image signal Vdb and the first DC voltage V1***b* from the signal processing device **170*b***.

Here, the first DC voltage V1*b* may be used for the operation of the power supply **290*b* and the timing controller 232*b* in the display 180*b***.

Next, the second interface **231*b* may receive a second DC voltage V2***b* from an external power supply **190*b*. Meanwhile, the second DC voltage V2***b* may be input to the data driver **236*b* in the display 180*b***.

The timing controller **232*b*** may output a data driving signal Sdab and a gate driving signal Sgab, based on the image signal Vdb.

For example, when the first interface **230*b* converts the input image signal Vdb and outputs the converted image signal va1***b*, the timing controller **232*b* may output the data driving signal Sdab and the gate driving signal Sgab based on the converted image signal va1***b*.

The timing controller **232*b* may further receive a control signal, a vertical synchronization signal Vsyncb, and the like, in addition to the image signal Vdb from the signal processing device 170*b***.

In addition to the image signal Vdb, based on a control signal, a vertical synchronization signal Vsyncb, and the like, the timing controller **232*b* generates a gate driving signal Sgab for the operation of the gate driver 234*b*, and a data driving signal Sdab for the operation of the data driver 236*b***.

At this time, when the panel **210*b*** includes a RGBW subpixel, the data driving signal Sdab may be a data driving signal for driving of RGBW subpixel.

Meanwhile, the timing controller **232*b* may further output a control signal Csb to the gate driver 234*b***.

The gate driver **234*b* and the data driver 236*b* supply a scan signal and an image signal to the organic light-emitting panel 210*b* through a gate line GLb and a data line DLb, respectively, according to the gate driving signal Sgab and the data driving signal Sdab from the timing controller 232*b*. Accordingly, the organic light-emitting panel 210*b*** displays a certain image.

Meanwhile, the panel **210*b*** may include an organic light emitting layer. In order to display an image, a plurality of gate lines GLb and data lines DLb may be disposed in a matrix form in each pixel corresponding to the organic light emitting layer.

Meanwhile, the data driver **236*b* may output a data signal to the organic light-emitting panel 210*b* based on a second DC voltage V2***b* from the second interface **231*b***.

The power supply **290*b* may supply various power supplies to the gate driver 234*b*, the data driver 236*b*, the timing controller 232*b***, and the like.

The current detector **510*b* may detect the current flowing in a sub-pixel of the panel 210*b*. The detected current may be input to the processor 270*b*** or the like, for a cumulative current calculation.

The processor **270*b* may perform each type of control of the display 180*b*. For example, the processor 270*b* may control the gate driver 234*b*, the data driver 236*b*, the timing controller 232*b***, and the like.

Meanwhile, the processor **270*b* may receive current information flowing in a sub-pixel of the panel 210*b* from the current detector 510*b***.

Figure 6A:
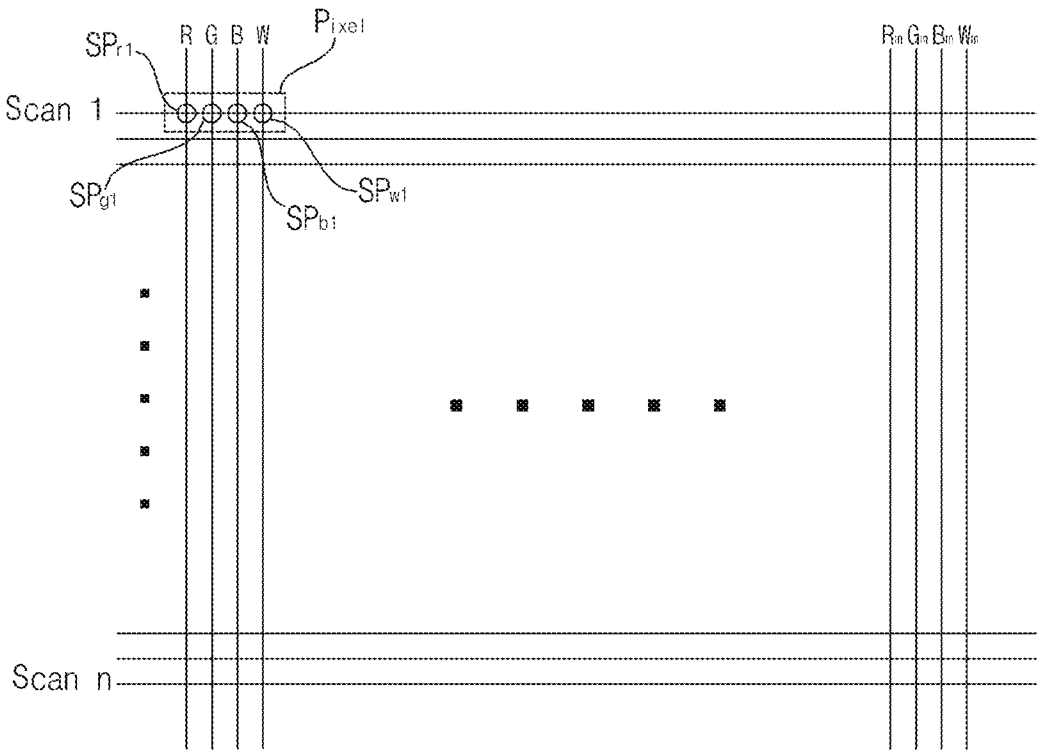
FIGS. 6A and 6B are diagrams referred to in the description of an organic light-emitting panel of FIG. 5.
Figure 6B:
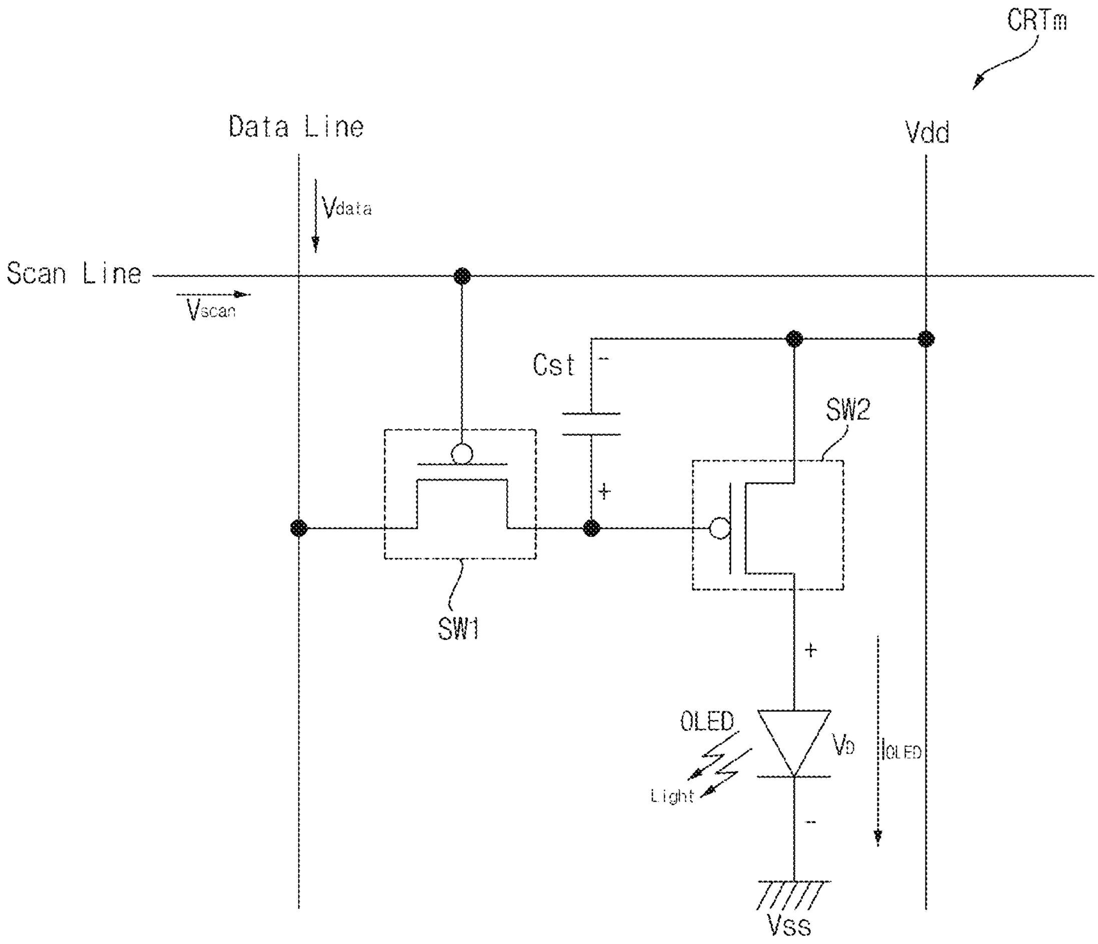

FIGS. 6A and 6B are diagrams referred to in the description of an organic light-emitting panel of FIG. 5.

First, FIG. 6A is a diagram illustrating a pixel in the organic light-emitting panel **210*b***.

Referring to the figure, the organic light-emitting panel **210*b* may include a plurality of scan lines Scan1 to Scann and a plurality of data lines R1, G1, B1, W1** to Rm, Gm, Bm, Wm intersecting the scan lines.

Meanwhile, a pixel (subpixel) is defined in an intersecting area of the scan line and the data line in the organic light-emitting panel 210*b*. In the figure, a pixel including subpixels SR1, SG1, SB1, and SW1 of RGBW is shown.

FIG. 6B illustrates a circuit of any one sub-pixel in the pixel of the organic light-emitting panel of FIG. 6A.

Referring to the figure, an organic light-emitting sub pixel circuit CRTm may include, as an active type, a scan switching element SW1, a storage capacitor Cst, a drive switching element SW2, and an organic light emitting layer OLED.

The scan switching element SW1 is turned on according to the input scan signal Vdscan, as a scan line is connected to a gate terminal. When it is turned on, the input data signal Vdata is transferred to the gate terminal of a drive switching element SW2 or one end of the storage capacitor Cst.

The storage capacitor Cst is formed between the gate terminal and the source terminal of the drive switching element SW2, and stores a certain difference between a data signal level transmitted to one end of the storage capacitor Cst and a DC voltage (VDD) level transmitted to the other terminal of the storage capacitor Cst.

For example, when the data signal has a different level according to a Plume Amplitude Modulation (PAM) method, the power level stored in the storage capacitor Cst varies according to the level difference of the data signal Vdata.

For another example, when the data signal has a different pulse width according to a pulse width modulation (PWM) method, the power level stored in the storage capacitor Cst varies according to the pulse width difference of the data signal Vdata.

The drive switching element SW2 is turned on according to the power level stored in the storage capacitor Cst. When the drive switching element SW2 is turned on, the driving current (IOLED), which is proportional to the stored power level, flows in the organic light emitting layer (OLED). Accordingly, the organic light emitting layer OLED performs a light emitting operation.

The organic light emitting layer OLED may include a light emitting layer (EML) of RGBW corresponding to a subpixel, and may include at least one of a hole injecting layer (HIL), a hole transporting layer (HTL), an electron transporting layer (ETL), and an electron injecting layer (EIL). In addition, it may include a hole blocking layer, and the like.

Meanwhile, the subpixels emit a white light in the organic light emitting layer OLED. However, in the case of green, red, and blue subpixels, a subpixel is provided with a separate color filter for color implementation. That is, in the case of green, red, and blue subpixels, each of the subpixels further includes green, red, and blue color filters. Meanwhile, since a white subpixel outputs a white light, a separate color filter is not required.

Meanwhile, in the figure, it is illustrated that a p-type MOSFET is used for a scan switching element SW1 and a drive switching element SW2, but an n-type MOSFET or other switching element, such as a JFET, IGBT, SIC, or the like are also available.

Meanwhile, the pixel is a hold-type element that continuously emits light in the organic light emitting layer (OLED), after a scan signal is applied, during a unit display period, specifically, during a unit frame.

Figure 7:
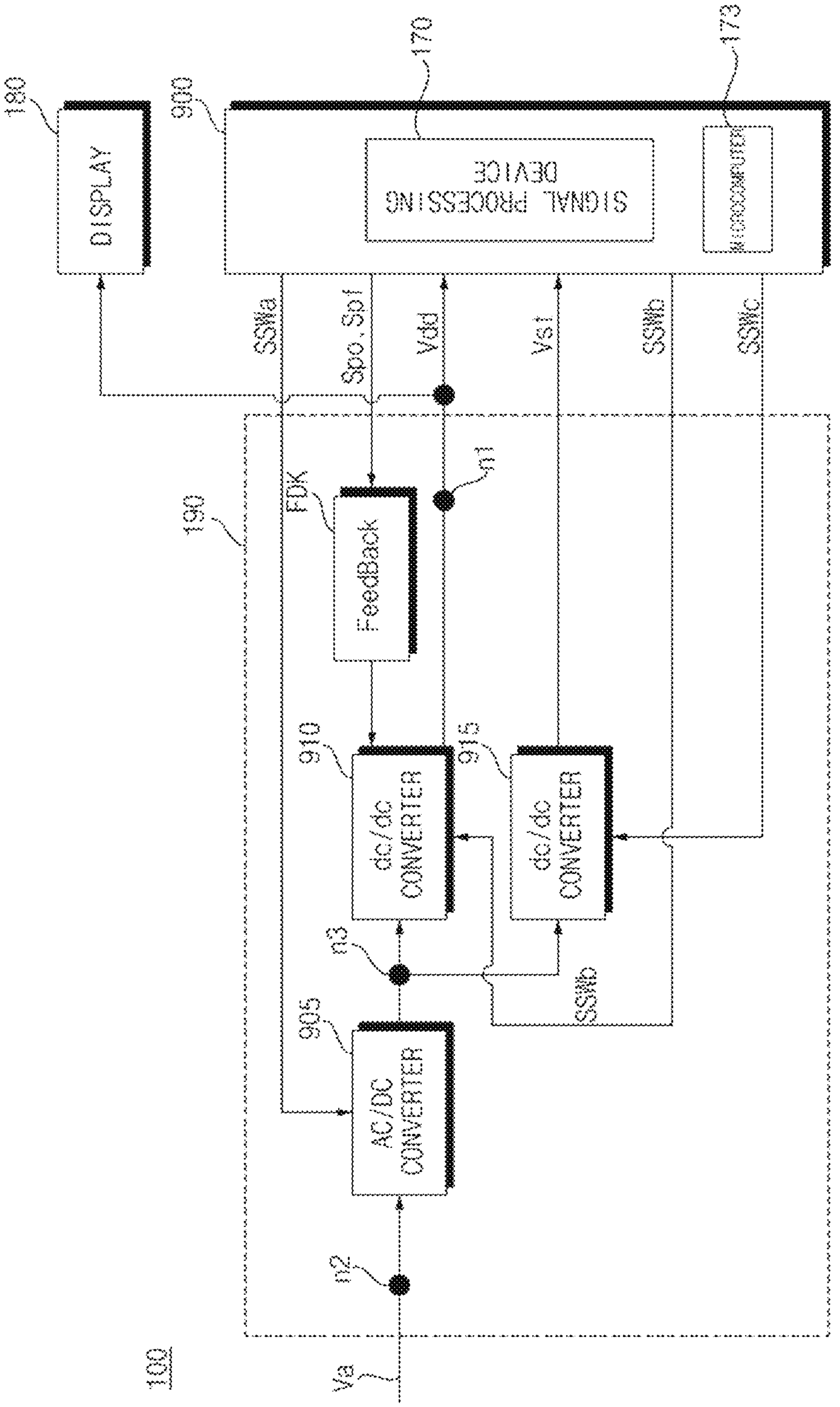
FIG. 7 is an exemplary internal block diagram of an image display apparatus according to an embodiment of the present disclosure.

FIG. 7 is an exemplary internal block diagram of an image display apparatus according to an embodiment of the present disclosure.

Referring to the drawing, the image display apparatus 100 according to an embodiment of the present disclosure includes a display 180, a signal processing device 170 configured to output an image signal to the display 180, and a converter 910 configured to supply a display driving voltage to the display 180.

The power supply 190 according to an embodiment of the present disclosure may include an ac/dc converter 905 for converting an input AC voltage into a DC voltage, and a dc/dc converter 910 for converting the level of the DC voltage from the ac/dc converter 905 to output a display driving voltage Vdd.

The figure illustrates that the ac/dc converter 905 is disposed between Node n2, which is an input terminal of the power supply 190, and an input node n3 of the dc/dc converter 910.

Meanwhile, an output node n1 of the ac/dc converter 905 may be electrically connected to the display 180.

The ac/dc converter 905 may include a diode or a switching element, and convert an input AC voltage Va into a DC voltage of a first level and output it.

The dc/dc converter 910 may converter an input DC voltage of the first level and output a display driving voltage VDD of a second level.

For example, the converter 910 may boost the DC voltage of the first level and output the display driving voltage Vdd of the second level higher than the first level.

On the one hand, if the display 180 is an organic light-emitting panel, the display driving voltage Vdd may be a pixel driving voltage for an organic light-emitting pixel.

On the other hand, if the display 180 is an inorganic light-emitting panel, the display driving voltage Vdd may be a pixel driving voltage for an inorganic light-emitting pixel.

On the other hand, if the display 180 is a liquid crystal panel, the display driving voltage Vdd may be a backlight driving voltage or a liquid crystal pixel driving voltage.

Meanwhile, the image display apparatus 100 according to an embodiment of the present disclosure further includes a main board 900 including a signal processing device 170 and a microcomputer 173.

The signal processing device 170 may output an image signal to the display 180.

Upon receiving a remote control signal, the microcomputer 173 may be operated to control the operation of the signal processing device 170 or the power supply 190.

The power supply 190 according to an embodiment of the present disclosure may output a microcomputer driving voltage Vst for the operation of the microcomputer 173.

To this end, the power supply 190 according to an embodiment of the present disclosure may further include a second dc/dc converter 915 for converting an input DC voltage of a first level to output a microcomputer driving voltage Vst of a third level.

At this time, the microcomputer driving voltage Vst may be lower than the display driving voltage Vdd.

Meanwhile, the mainboard 900 or the signal processing device 170 may output a display-on signal Spo or a display-off signal Spf to the power supply 190.

Accordingly, if the display 180 is on, the dc/dc converter 910 may be operated, and if the display 180 is off, the dc/dc converter 910 may stop operating.

On the one hand, the main board 900 or the signal processing device 170 may output a switch driving control signal SSwa to the ac/dc converter 905. Accordingly, the ac/dc converter 905 may be stably driven.

On the other hand, the mainboard 900 or the signal processing device 170 may output a switch driving control signal SSwb to the dc/dc converter 910. Accordingly, the dc/dc converter 910 may be stably driven.

On the other hand, the mainboard 900 or the signal processing device 170 may output a switch driving control signal SSwc to the second dc/dc converter 915. Accordingly, the second dc/dc converter 915 may be stably driven.

Meanwhile, the power supply 190 may further include a signal transmitter FDK connected between the converter 910 and the mainboard 900.

The signal transmitter FDK may receive a display-on signal Spo or a display-off signal Spf from the mainboard 900 including the signal processing device 170 or from the signal processing device 170, and transmit the display-on signal Spo or the display-off signal Spf to the converter 910.

Figure 8:
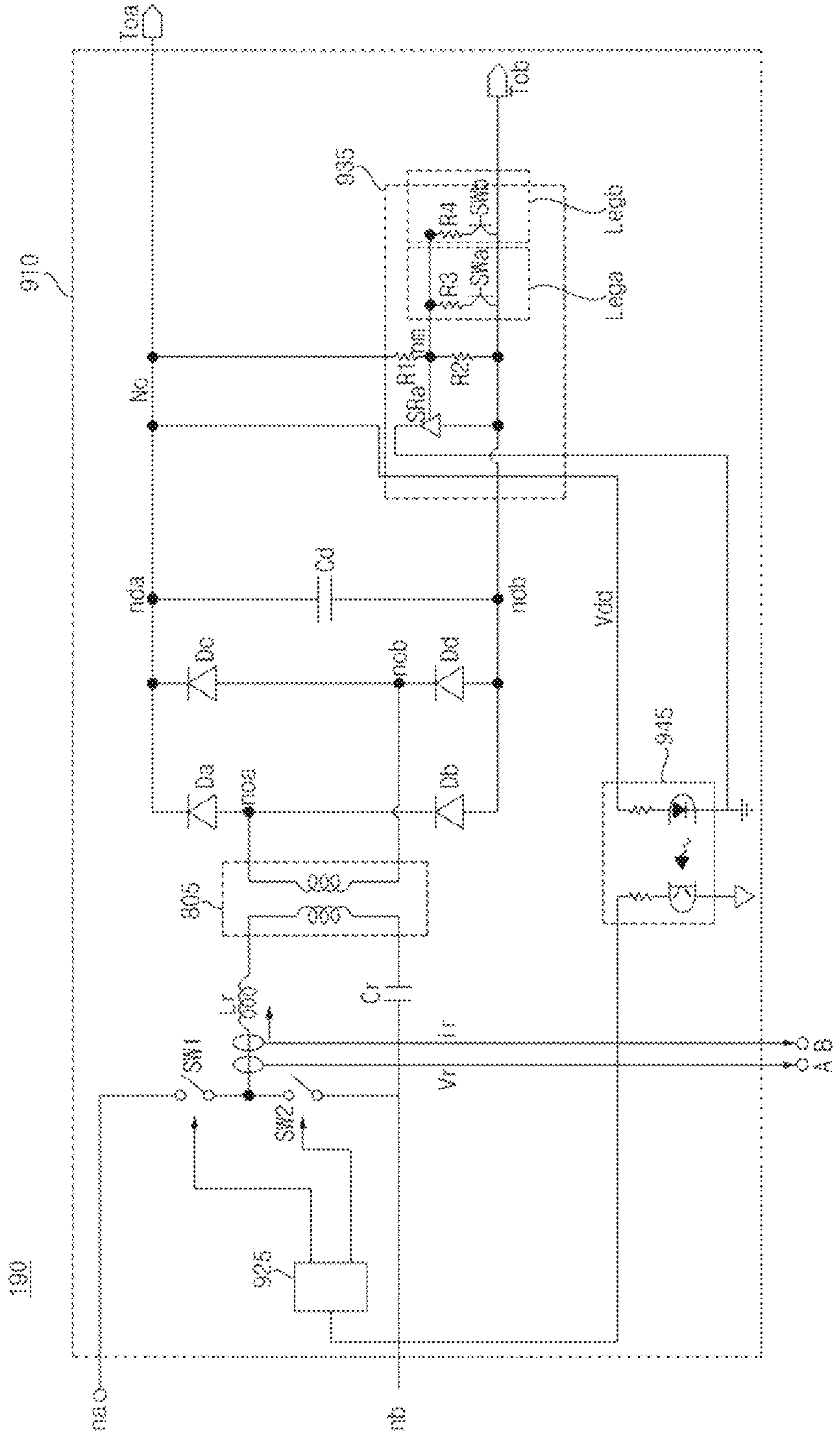
FIG. 8 is an exemplary circuit diagram of a power supply according to an embodiment of the present disclosure.

FIG. 8 is an exemplary circuit diagram of a power supply according to an embodiment of the present disclosure.

Referring to the drawing, the power supply 190 according to an embodiment of the present disclosure includes a converter 910 configured to supply a display driving voltage Vdd to the display 180.

In this case, the converter 910 may be the dc/dc converter 910 illustrated in FIG. 7.

The converter 910 according to an embodiment of the present disclosure may output a display driving voltage of a first level LV1 based on a first mode, may output a display driving voltage of a second level LV2, higher than the first level LV1, based on a second mode, and may change a reference level for overcurrent protection based on the first mode or the second mode. Accordingly, heat generated by the circuit elements in the converter 910 may be reduced. Particularly, even when the level of the display driving voltage Vdd changes, heat generated by the circuit elements in the converter 910 may be reduced.

Figure 12A:
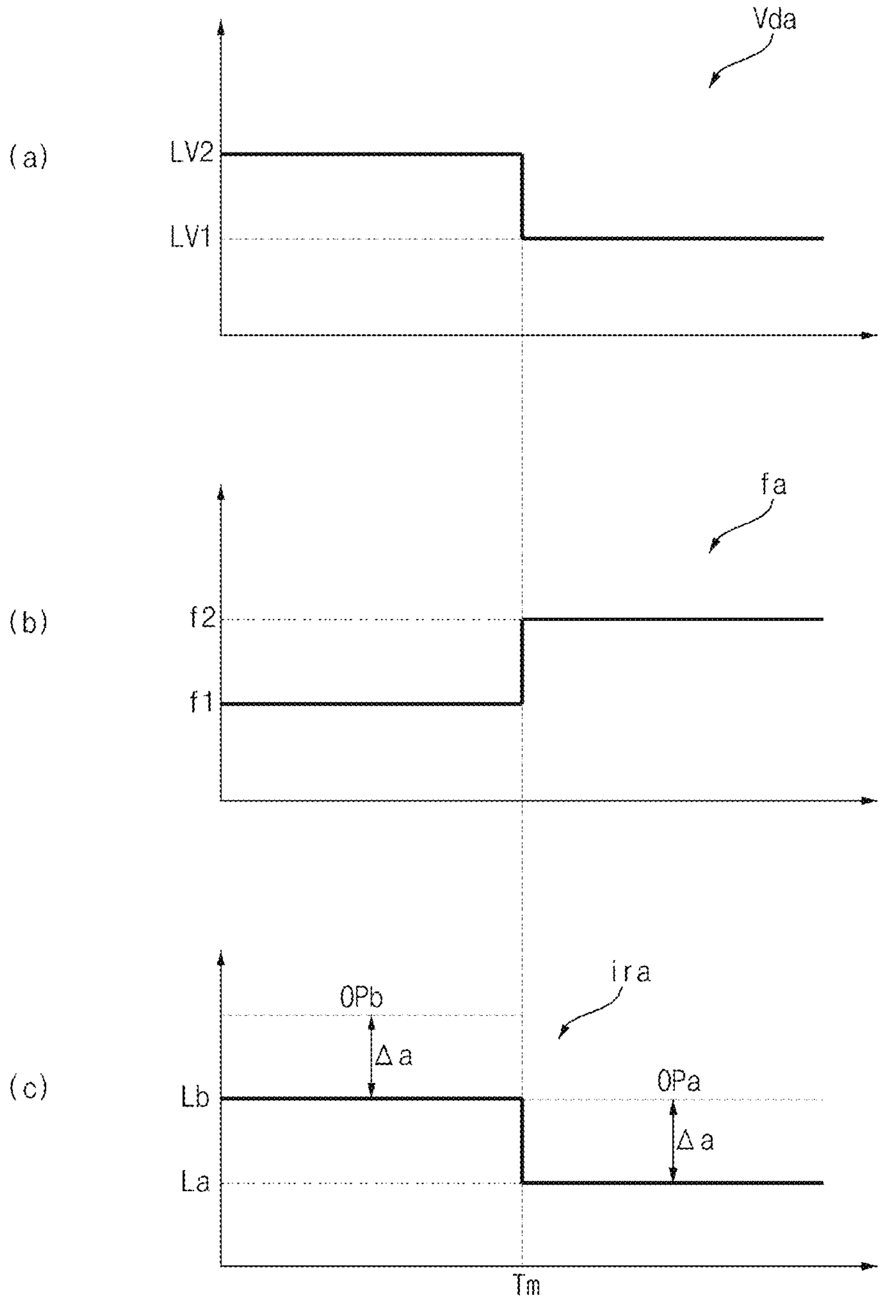
FIGS. 12A to 13B are diagrams referred to in the description of FIG. 11.

Meanwhile, a first reference level OPa (see (c) of FIG. 12A) for overcurrent protection in the first mode may be lower than a second reference level OPb (see (c) of FIG. 12A) for overcurrent protection in the second mode.

Meanwhile, the converter 910 includes a transformer 805, a first switching element SW1 and a second switching element SW2 which are disposed at an input terminal of the transformer 805 and connected in series with each other, a resonant capacitor Cr and a resonant inductor Lr which are disposed between and respectively connected to the input terminal of the transformer 805 and the second switching element SW2, and a switching controller 925 configured to control the first switching element SW1 and the second switching element SW2.

Meanwhile, the switching controller 925 may change a reference level for overcurrent protection based on the first mode or the second mode. Accordingly, even when the level of the display driving voltage Vdd changes, heat generated by the circuit elements in the converter 910 may be reduced.

Meanwhile, the switching controller 925 may control the first reference level OPa for overcurrent protection in the first mode to be lower than the second reference level OPb for overcurrent protection in the second mode. Accordingly, even when the level of the display driving voltage Vdd changes, heat generated by the circuit elements in the converter 910 may be reduced.

Meanwhile, the converter 910 may further include a current detector B configured to detect a current ir flowing through the resonant inductor Lr.

Meanwhile, the current ir detected by the current detector B may be input to the switching controller 925.

Meanwhile, the converter 910 may further include a voltage detector A configured to detect a node voltage Vr between the first switching element SW1 and the second switching element SW2.

Meanwhile, the voltage Vr detected by the voltage detector A may be input to the switching controller 925.

Meanwhile, the converter 910 may further include a voltage detector 945 configured to detect the display driving voltage Vdd output from an output terminal of the transformer 805.

Meanwhile, the display driving voltage Vdd detected by the voltage detector 945 or a voltage corresponding to the display driving voltage Vdd may be input to the switching controller 925.

Meanwhile, the switching controller 925 may change a reference level for overcurrent protection based on the level of the display driving voltage Vdd from the voltage detector 945. Accordingly, even when the level of the display driving voltage Vdd changes, heat generated by the circuit elements in the converter 910 may be reduced.

Meanwhile, if the level of the display driving voltage Vdd from the voltage detector 945 corresponds to the first level LV1, the switching controller 925 may set the first reference level OPa for overcurrent protection.

Meanwhile, if the level of the display driving voltage Vdd from the voltage detector 945 corresponds to the second level LV2, the switching controller 925 may set the second reference level OPb for overcurrent protection which is higher than the first reference level OPa.

Accordingly, even when the level of the display driving voltage Vdd changes, heat generated by the circuit elements in the converter 910 may be reduced.

Meanwhile, the converter 910 according to an embodiment of the present disclosure may include a multi-level voltage output circuit 935 connected to an output terminal No-Ng of the transformer 805 and configured to output the display driving voltage of the first level LV1 or the display driving voltage of the second level LV2 based on at least one of the first mode and the second mode.

Meanwhile, the multi-level voltage output circuit 935 according to an embodiment of the present disclosure may also output any one of the display driving voltage of the first level LV1, the display driving voltage of the second level LV2, and a display driving voltage of a third level LV3, based on one of the first mode to a third mode.

In particular, a display driving voltage may be outputted through the Toa terminal in the drawing. The Tob terminal may be a ground terminal.

Meanwhile, the converter 910 may include a capacitor Co disposed between the output terminal No-Ng of the transformer 805 and the multi-level voltage output circuit 935.

Meanwhile, the multi-level voltage output circuit 935 according to an embodiment of the present disclosure includes a first resistor element R1 and a second resistor element R2 disposed at the output terminal No-Ng of the transformer 805 and connected in series to each other, a third resistor element R3 and a third switching element SWa disposed at a first leg connected in parallel to both ends of the second resistor element R2, and connected in series to each other, and a fourth resistor element R4 and a fourth switching element SWb disposed at a second leg connected in parallel to both ends of the second resistor element R2, and connected in series to each other.

That is, the third resistor element R3 and the third switching element SWa connected in series to each other are disposed at the first leg between an nm terminal and an Ng terminal, which are both ends of the second resistor element R2.

On the other hand, the fourth resistor element R4 and the fourth switching element SWb connected in series to each other are disposed at the second leg between the nm terminal and the Ng terminal, which are both ends of the second resistor element R2.

Meanwhile, the power supply 190 may output one of the display driving voltages of the first to third levels LV1 and LV3, based on the turn-on or turn-off of the third switching element SWa or the fourth switching element SWb.

For example, in the first mode, if both the third switching element SWa and the fourth switching element SWb are turned off, the power supply 190 may output a display driving voltage of a first level LV1.

As another example, in the second mode, if one of the third switching element SWa and the fourth switching element SWb is turned on, and the other one is turned off, the power supply 190 may output a display driving voltage of a second level LV2.

As yet another example, in the third mode, if both the third switching element SWa and the fourth switching element SWb are turned on, the power supply 190 may output a display driving voltage of a third level LV3. Accordingly, it is possible to reduce heat generation by supplying various display driving voltages.

Meanwhile, the converter 910 may further include a voltage detector 945 configured to detect a display driving voltage output from an output terminal No-Ng of the transformer 805, and a switching controller 925 configured to control the first switching element SW1 or the third switching element Swa based on the voltage detected by the voltage detector 945.

On the one hand, the voltage detector 945 may detect the voltage at both ends nm-Ng of the second resistor element R2, and the switching controller 925 may be configured to increase the voltage at the output terminal No-Ng of the transformer 805 as the voltage at both ends of the second resistor element R2 becomes lower.

On the other hand, the voltage detector 945 may detect the voltage at both ends nm-Ng of the second resistor element R2, and the switching controller may be configured to decrease the voltage at the output terminal No-Ng of the transformer 805 as the voltage at both ends of the second resistor element R2 becomes higher.

For example, during a first mode operation, if the voltage detected by the voltage detector 945 is lower than a first reference voltage corresponding to the first mode, the switching controller 925 may control the first switching element SW1 or the second switching element SW2 for the voltage detected by the voltage detector 945 to reach the first reference voltage.

Specifically, during a first mode operation, if the voltage detected by the voltage detector 945 is lower than a first reference voltage corresponding to the first mode, the switching controller 925 may be configured to increase the turn-on duty of the first switching element SW1 or the second switching element SW2. Accordingly, a display driving voltage corresponding to the first mode may be supplied.

As another example, during a first mode operation, if the voltage detected by the voltage detector 945 is higher than a first reference voltage corresponding to the first mode, the switching controller 925 may control the first switching element SW1 or the second switching element SW2 for the voltage detected by the voltage detector 945 to reach the first reference voltage.

Specifically, during a first mode operation, if the voltage detected by the voltage detector 945 is higher than a first reference voltage corresponding to the first mode, the switching controller 925 may be configured to decrease the turn-on duty of the first switching element SW1 or the second switching element SW2. Accordingly, a display driving voltage corresponding to the first mode may be supplied.

On the other hand, if the voltage detected by the voltage detector 945 is lower than a second reference voltage corresponding to the second mode, the switching controller 925 may control the first switching element SW1 or the second switching element SW2 for the voltage detected by the voltage detector 945 to reach the second reference voltage. Accordingly, a display driving voltage corresponding to the second mode may be supplied.

For example, during a second mode operation, if the voltage detected by the voltage detector 945 is lower than a second reference voltage corresponding to the second mode, the switching controller 925 may control the first switching element SW1 or the second switching element SW2 for the voltage detected by the voltage detector 945 to reach the second reference voltage.

Specifically, during a second mode operation, if the voltage detected by the voltage detector 945 is lower than a second reference voltage corresponding to the second mode, the switching controller 925 may be configured to increase the turn-on duty of the first switching element SW1 or the second switching element SW2. Accordingly, a display driving voltage corresponding to the second mode may be supplied.

As another example, during a second mode operation, if the voltage detected by the voltage detector 945 is higher than a second reference voltage corresponding to the second mode, the switching controller 925 may control the first switching element SW1 or the second switching element SW2 for the voltage detected by the voltage detector 945 to reach the second reference voltage.

Specifically, during a second mode operation, if the voltage detected by the voltage detector 945 is higher than a second reference voltage corresponding to the second mode, the switching controller 925 may be configured to decrease the turn-on duty of the first switching element SW1 or the second switching element SW2. Accordingly, a display driving voltage corresponding to the second mode may be supplied.

On the other hand, if the voltage detected by the voltage detector 945 is lower than a third reference voltage corresponding to the third mode, the switching controller 925 may control the first switching element SW1 or the second switching element SW2 for the voltage detected by the voltage detector 945 to reach the third reference voltage. Accordingly, a display driving voltage corresponding to the third mode may be supplied.

For example, during a third mode operation, if the voltage detected by the voltage detector 945 is lower than a third reference voltage corresponding to the third mode, the switching controller 925 may control the first switching element SW1 or the second switching element SW2 for the voltage detected by the voltage detector 945 to reach the third reference voltage.

Specifically, during a third mode operation, if the voltage detected by the voltage detector 945 is lower than a third reference voltage corresponding to the third mode, the switching controller 925 may be configured to increase the turn-on duty of the first switching element SW1 or the second switching element SW2. Accordingly, a display driving voltage corresponding to the third mode may be supplied.

As another example, during a third mode operation, if the voltage detected by the voltage detector 945 is higher than a third reference voltage corresponding to the third mode, the switching controller 925 may control the first switching element SW1 or the second switching element SW2 for the voltage detected by the voltage detector 945 to reach the third reference voltage.

Specifically, during a third mode operation, if the voltage detected by the voltage detector 945 is higher than a third reference voltage corresponding to the third mode, the switching controller 925 may be configured to de crease the turn-on duty of the first switching element SW1 or the second switching element SW2. Accordingly, a display driving voltage corresponding to the third mode may be supplied.

Meanwhile, the power supply 190 may further include a resonance capacitor Cr and a resonance inductor Lr each connected between the input terminal of the transformer 805 and the second switching element SW2. Accordingly, various display driving voltages may be supplied by using resonance.

Meanwhile, the voltage detector 945 may include a regulator SRa electrically connected to one end of the second resistor element R2 and a photo coupler PTD electrically connected to the regulator SRa, for transmitting the voltage between both ends of the second resistor element R2 to the switching controller 925. Accordingly, it is possible to reduce heat generation by supplying various display driving voltages based on feedback of the voltage between both ends of the second resistor element R2.

As a result, the power supply 190 of FIG. 8 may output any one of the display driving voltage of the first level LV1, the display driving voltage of the second level LV2, or the display driving voltage of the third level LV3, through the multi-level voltage output circuit 935 serving as an LLC-based resonant dc/dc converter.

Meanwhile, the first mode may be an echo mode, the second mode may be a movie mode or a game mode, and the third mode may be a High Dynamic Range (HDR) mode.

Alternatively, the first mode may be a display power control (DPC)-on mode, the second mode may be a display power control (DPC)-off mode, and the third mode may be a peak-on mode.

FIGS. 9A to 9E are diagrams referred to in the description of FIG. 8.

Figure 9A:
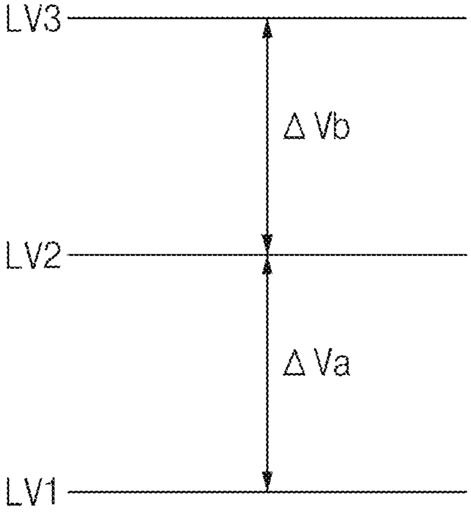
FIGS. 9A to 9E are diagrams referred to in the description of FIG. 8.

FIG. 9A is a diagram illustrating first to third levels of a display driving voltage.

Referring to the figure, the power supply 190 may output either a display driving voltage of a first level LV1, a display driving voltage of a second level LV2, or a display driving voltage of a third level LV3.

Meanwhile, it is desirable that the difference Vb between the third level LV3 and the second level LV2 is greater than the difference Va between the second level LV2 and the first level LV1.

For example, the display driving voltage of the first level LV1 may be approximately 22 V, the display driving voltage of the second level LV2 may be approximately 24 V, and the display driving voltage of the third level LV3 may be approximately 25.5 V or approximately 26 V.

Accordingly, it is possible to supply various display driving voltages in various modes. In particular, in High Dynamic Range mode, a display driving voltage suitable for the display 180 may be outputted.

Figure 9B:
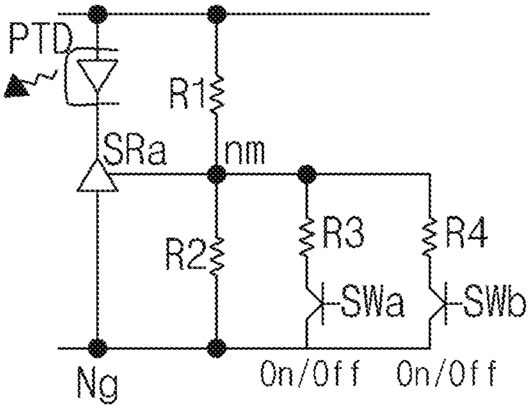

FIG. 9B is a diagram illustrating the multi-level voltage output circuit 935 of FIG. 8.

Referring to the figure, the multi-level voltage output circuit 935 includes a first resistor element R1 and a second resistor element R2 disposed at the output terminal No-Ng of the transformer 805 and connected in series to each other, a third resistor element R3 and a third switching element SWa disposed at a first leg connected in parallel to both ends of the second resistor element R2, and connected in series to each other, and a fourth resistor element R4 and a fourth switching element SWb disposed at a second leg connected in parallel to both ends of the second resistor element R2, and connected in series to each other.

Meanwhile, the voltage detector 945 may include a regulator SRa electrically connected to one end of the second resistor element R2 and a photo coupler PTD electrically connected to the regulator SRa, for transmitting the voltage between both ends of the second resistor element R2 to the switching controller 925.

At this time, as shown in the drawing, the photo coupler PTD may be disposed between one end No of the first resistor element R1 and the regulator SRa.

The voltage detector 945 may transmit a detected current or a detected voltage to the switching controller 925, based on the conduction of the photo coupler PTD.

Figure 9C:
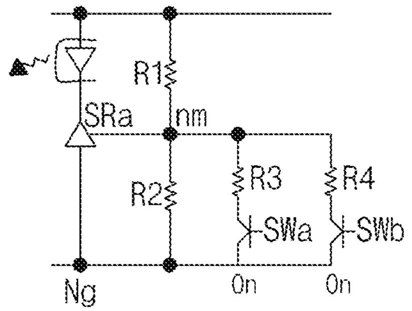
Figure 9D:
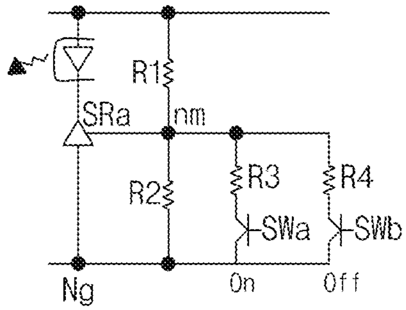
Figure 9E:
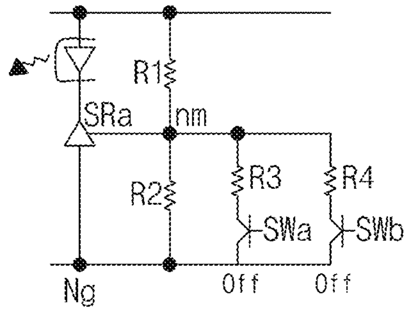

FIGS. 9C to 9E are diagrams illustrating an example of operation of the multi-level voltage output circuit 935 in the first to third modes.

FIG. 9C illustrates the third mode in which both of the third switching element SWa and the fourth switching element SWb are turned on.

FIG. 9D illustrates the second mode in which any one of the third switching element SWa and the fourth switching element SWb is turned on.

FIG. 9E illustrates the first mode in which both of the third switching element SWa and the fourth switching element SWb are turned off.

For example, a description will be given on the assumption that the first to fourth resistor elements have a resistance value of 2 kΩ.

In the first mode, both the third switching element SWa and the fourth switching element SWb are turned off, and therefore the total resistance is approximately 4 kΩ because of the first resistor element and the second resistor element.

In the second mode, one of the third switching element SWa and the fourth switching element SWb is turned on, and therefore the resistance at both ends of the second resistor element is 1 kQ, and the total resistance is approximately 3 kΩ in consideration of the first resistor element.

In the third mode, both the third switching element SWa and the fourth switching element SWb are turned on, and therefore the resistance at both ends of the second resistor element is 0.67 kQ, and the total resistance is approximately 2.67 kΩ in consideration of the first resistor element.

Accordingly, the total resistance is highest in the first mode, and the total resistance is lowest in the third mode.

As described above, by using a difference in total resistance values of the multi-level voltage output circuit 935 in the first to third modes, the power supply 190 may output any one of the display driving voltage of the first level LV1, the display driving voltage of the second level LV2, and the display driving voltage of the third level LV3. Accordingly, various display driving voltages may be supplied in various modes.

Figure 10A:
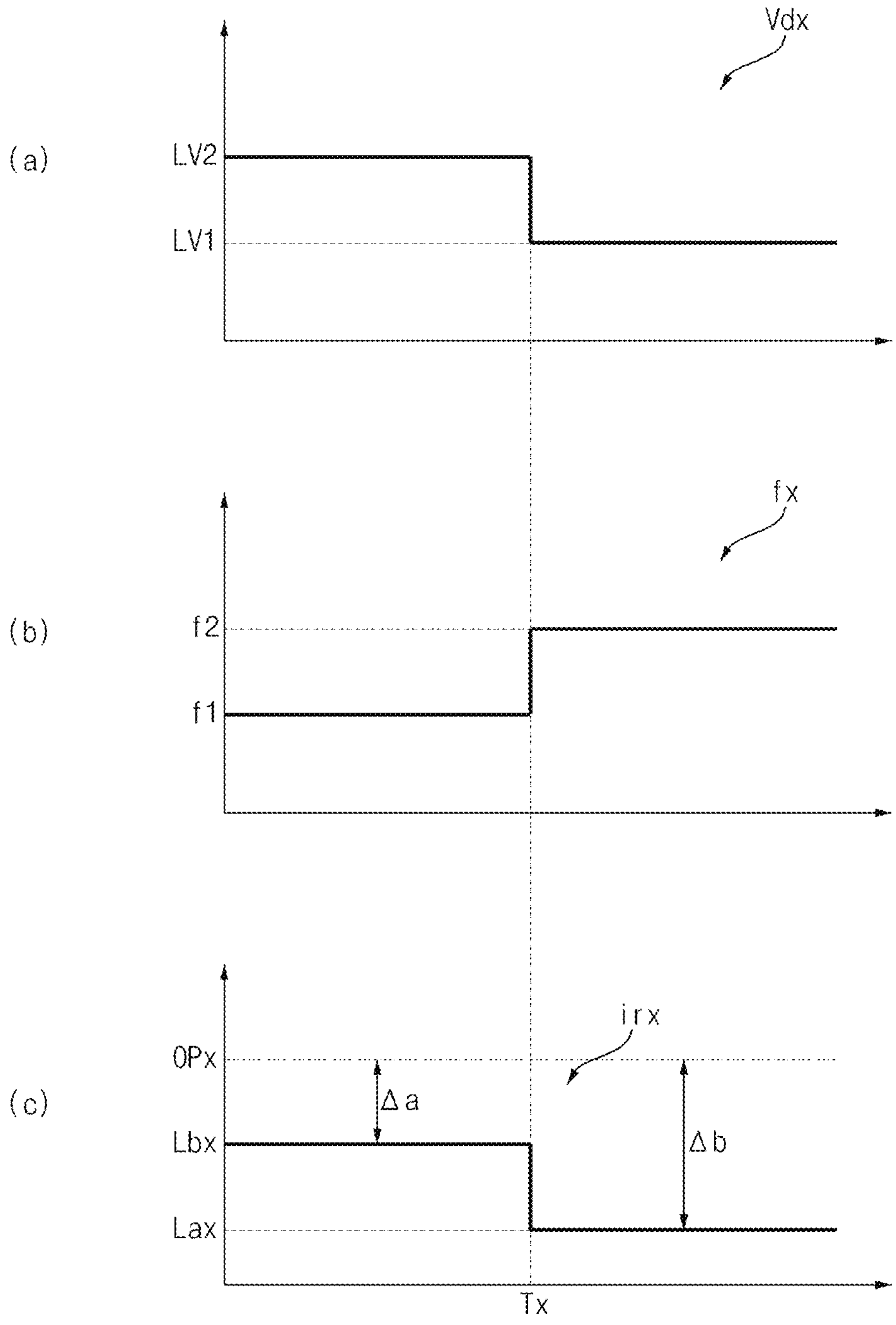
FIGS. 10A and 10B are diagrams referred to in the description of the operation of a power supply related to the present disclosure.
Figures 10B, 11:
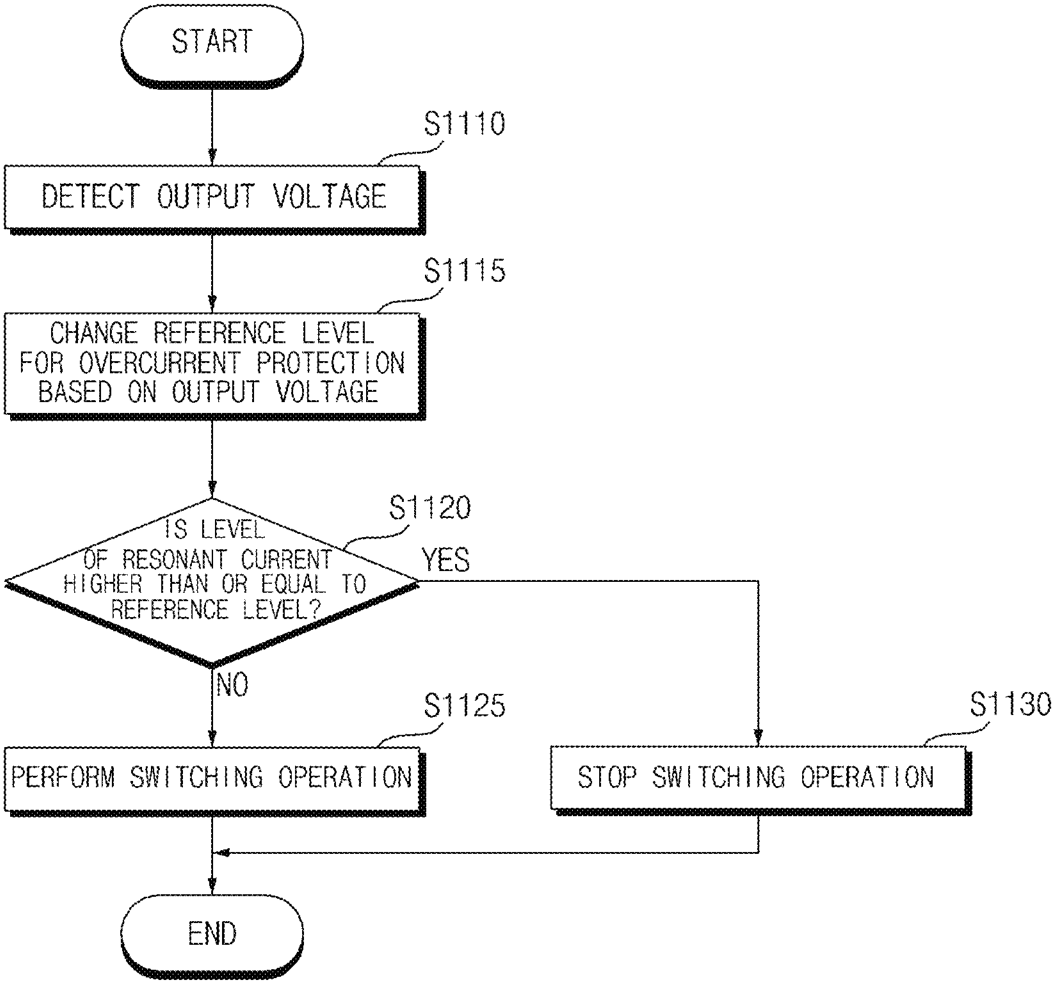
FIG. 11 is a flowchart illustrating an operating method of an image display apparatus according to an embodiment of the present disclosure.

FIGS. 10A and 10B are diagrams referred to in the description of the operation of a power supply related to the present disclosure.

FIG. 10A is a diagram referred to in the description of the operation of a converter related to the present disclosure.

Referring to the drawings, (a) of FIG. 10A illustrates a display driving voltage waveform Vdx.

The converter 910 may output the display driving voltage of the second level LV2 based on the second mode, and after a time point Tx, may output the display driving voltage of the first level LV1, which is lower than the second level LV2, based on the first mode.

In FIG. 10A, (b) illustrates a switching frequency waveform fdx of the first switching element SW1 and the second switching element SW2.

Meanwhile, the switching controller 925 may vary the switching frequency of the first switching element SW1 and the second switching element SW2 according to the level of the display driving voltage.

For example, if the level of a display driving voltage decreases, the switching controller 925 may increase the switching frequency of the first switching element SW1 and the second switching element SW2.

Accordingly, when outputting the display driving voltage of the second level LV2 based on the second mode, the switching controller 925 may control the first switching element SW1 or the second switching element SW2 to switch to a first frequency f1.

Meanwhile, when outputting the display driving voltage of the first level LV1 based on the first mode after the time point Tx, the switching controller 925 may control the first switching element SW1 or the second switching element SW2 to switch to a second frequency f2 which is higher than the first frequency f1.

In FIG. 10A, (c) illustrates a reference level OPx for overcurrent in the converter 910.

Meanwhile, based on one of the first mode and the second mode, the switching controller 925 may set a reference level for overcurrent of a current ir flowing through the resonant inductor Lr.

In the drawing, an example is illustrated in which a reference level for overcurrent is fixed at OPx based on the second mode.

Meanwhile, when the converter 910 operates in the second mode, a level of the current ir flowing through the resonant inductor Lr may be Lbx, in which case a difference between the level Lbx and the reference level OPx may be Δa.

Meanwhile, when the converter 910 operates in the first mode after the time point Tx, a level of the current ir flowing through the resonant inductor Lr may be Lax, in which case a difference between the level Lax and the reference level OPx may be Δb which is greater than Aa.

As described above, if a difference or margin between current levels and the reference level OPx increases when the converter 910 operates in the first mode, temperature of circuit elements, particularly the transformer 805, rises significantly due to the increase in current ir flowing through the resonant inductor Lr.

The reference level OPx is set in order to prevent the overcurrent, but as the difference or margin between current levels and the reference level OPx increases, the operation for overcurrent protection is delayed, thereby increasing the possibility of burnout of circuit elements and the like.

FIG. 10B is a diagram illustrating the display driving voltage and the temperature of a transformer according to FIG. 10A.

Referring to the drawing, if the display driving voltage is approximately 20V in the first mode, a difference or margin between the voltage level and the reference level OPx is largest, such that the temperature of the transformer 805 may be approximately 150° C. In this case, there is a highest possibility of burnout of the transformer 805.

Meanwhile, if the display driving voltage is approximately 22V in the second mode, the temperature of the transformer 805 may be approximately 140° C. due to a difference or margin between the voltage level and the reference level Opx. In this case, there is a high possibility of burnout of the transformer 805.

Meanwhile, if the display driving voltage is approximately 24V in the third mode, a difference or margin between the voltage level and the reference level Opx is smallest, such that the temperature of the transformer 805 may be approximately 125° C. In this case, there is a low possibility of burnout of the transformer 805.

As illustrated in FIGS. 10A and 10B, even when the level of the display driving voltage output from the converter 910 changes, the reference level for overcurrent of the current ir flowing through the resonant inductor Lr is fixed, such that the possibility of burnout of the circuit elements increases.

Accordingly, the present disclosure proposes a method of changing the reference level for overcurrent of the current ir flowing through the resonant inductor Lr according to a change in level of the display driving voltage output from the converter 910, which will be described below with reference to FIG. 11 and subsequent figures.

FIG. 11 is a flowchart illustrating an operating method of an image display apparatus according to an embodiment of the present disclosure.

Referring to the drawing, the voltage detector 945 in the converter 910 of the image display apparatus 100 according to an embodiment of the present disclosure detects a display driving voltage Vdd output from the output terminal of the transformer 805 (S1110).

Then, the switching controller 925 may change the reference level for overcurrent protection based on the level of the display driving voltage Vdd from the voltage detector 945 (51115).

For example, if the level of the display driving voltage Vdd from the voltage detector 945 corresponds to a first level LV1, the switching controller 925 may set a first reference level OPa for overcurrent protection, and if the level of the display driving voltage Vdd from the voltage detector 945 corresponds to a second level LV2, the switching controller 925 may set a second reference level OPb for overcurrent protection, which is higher than the first reference level OPa.

That is, the switching controller 925 may control the first reference level OPa for overcurrent protection in the first mode to be lower than the second reference level OPb for overcurrent protection in the second mode.

Meanwhile, the current detector B may detect a resonant current ir flowing through the resonant inductor Lr.

Then, the switching controller 925 determines whether a level of the detected resonant current ir is higher than or equal to the set reference level (S1120), and upon determining that the level of the detected resonant current ir is higher than or equal to the reference level, the switching controller 925 may control the first switching element SW1 and the second switching element SW2 to stop a switching operation (S1130).

Meanwhile, upon determining in operation 1120 (S1120) that the level of the detected resonant current ir is lower than the set reference level, the switching controller 925 may control the first switching element SW1 and the second switching element SW2 to perform a switching operation (S1125).

For example, if a level of the current flowing through the resonant inductor Lr is higher than or equal to the first reference level OPa in the first mode, the switching controller 925 may control the first switching element SW1 and the second switching element SW2 to stop a switching operation. Accordingly, heat generated by the circuit elements of the converter 910 in the first mode may be reduced.

In this case, if a level of the current flowing through the resonant inductor Lr is higher than or equal to the first reference level OPa in the first mode, the switching controller 925 may control the first switching element SW1 and the second switching element SW2 to stop a switching operation for a first period of time.

In another example, if a level of the current flowing through the resonant inductor Lr in the second mode is higher than or equal to the second reference level OPb which is higher than the first reference level OPa, the switching controller 925 may control the first switching element SW1 and the second switching element SW2 to stop a switching operation. Accordingly, heat generated by the circuit elements of the converter 910 in the second mode may be reduced. Further, even when the level of the display driving voltage Vdd changes, heat generated by the circuit elements of the converter 910 may be reduced.

In this case, if a level of the current flowing through the resonant inductor Lr in the second mode is higher than or equal to the second reference level OPb which is higher than the first reference level OPa, the switching controller 925 may control the first switching element SW1 and the second switching element SW2 to stop a switching operation for a second period of time which is longer than the first period of time.

Meanwhile, if the current flowing through the resonant inductor Lr in the first mode is a first current at a level higher than or equal to the first reference level OPa, the switching controller 925 may control the first switching element SW1 and the second switching element SW2 to stop a switching operation, and if the current flowing through the resonant inductor Lr in the second mode is the first current at a level between the first reference level OPa and the second reference level OPb higher than or equal to the first reference level OPa, the switching controller 925 may control the first switching element SW1 and the second switching element SW2 to perform a switching operation. Accordingly, the switching operation may be selectively stopped according to the current flowing through the resonant inductor Lr.

FIG. 12A is a diagram illustrating an example of the operation of a converter according to an embodiment of the present disclosure.

Referring to the drawing, (a) of FIG. 12A illustrates a display driving voltage waveform Vda.

The converter 910 may output a display driving voltage of a second level LV2 based on the second mode, and after a time point Tm, the converter 910 may output a display driving voltage of a first level LV1, which is lower than the second level LV2, based on the first mode.

In FIG. 12A, (b) illustrates a switching frequency waveform fa of the first switching element SW1 and the second switching element SW2.

Meanwhile, the switching controller 925 may vary the switching frequency of the first switching element SW1 and the second switching element SW2 according to the level of the display driving voltage.

For example, if the level of a display driving voltage decreases, the switching controller 925 may increase the switching frequency of the first switching element SW1 and the second switching element SW2.

Accordingly, when outputting the display driving voltage of the second level LV2 based on the second mode, the switching controller 925 may control the first switching element SW1 or the second switching element SW2 to switch to a first frequency f1.

Meanwhile, when outputting the display driving voltage of the first level LV1 based on the first mode after the time point Tm, the switching controller 925 may control the first switching element SW1 or the second switching element SW2 to switch to a second frequency f2 which is higher than the first frequency f1.

In FIG. 12A, (c) illustrates a reference level for overcurrent in the converter 910.

Meanwhile, the switching controller 925 may set a reference level for overcurrent of a current ir flowing through the resonant inductor Lr based on the first mode and the second mode, respectively.

In the drawing, an example is illustrated in which a reference level for overcurrent of the current ir flowing through the resonant inductor Lr is set to the first reference level OPa in the first mode, and is set to the second reference level OPb, which is higher than the first reference level OPa, in the second mode.

Accordingly, when the converter 910 operates in the second mode, the current ir flowing through the resonant inductor Lr may be at a level Lb, in which case a difference between the level Lb and the second reference level OPb may be Δa.

Meanwhile, if the converter 910 operates in the first mode after the time point Tm, the current ir flowing through the resonant inductor Lr may be at a level La, in which case a difference between the level La and the first reference level OPa may be equal to Δa or almost similar to Δa.

Accordingly, even when the converter 910 operates in each of the first mode or the second mode, a difference between the level of the current ir, flowing through the resonant inductor Lr, and the variable reference level OPa or OPb remains the same or almost constant, such that overcurrent protection may be stably performed.

Further, the possibility of burnout of the circuit element in the converter 910 may be significantly reduced, and particularly the possibility of burnout of the transformer 805 may be significantly reduced.

Figure 12B:
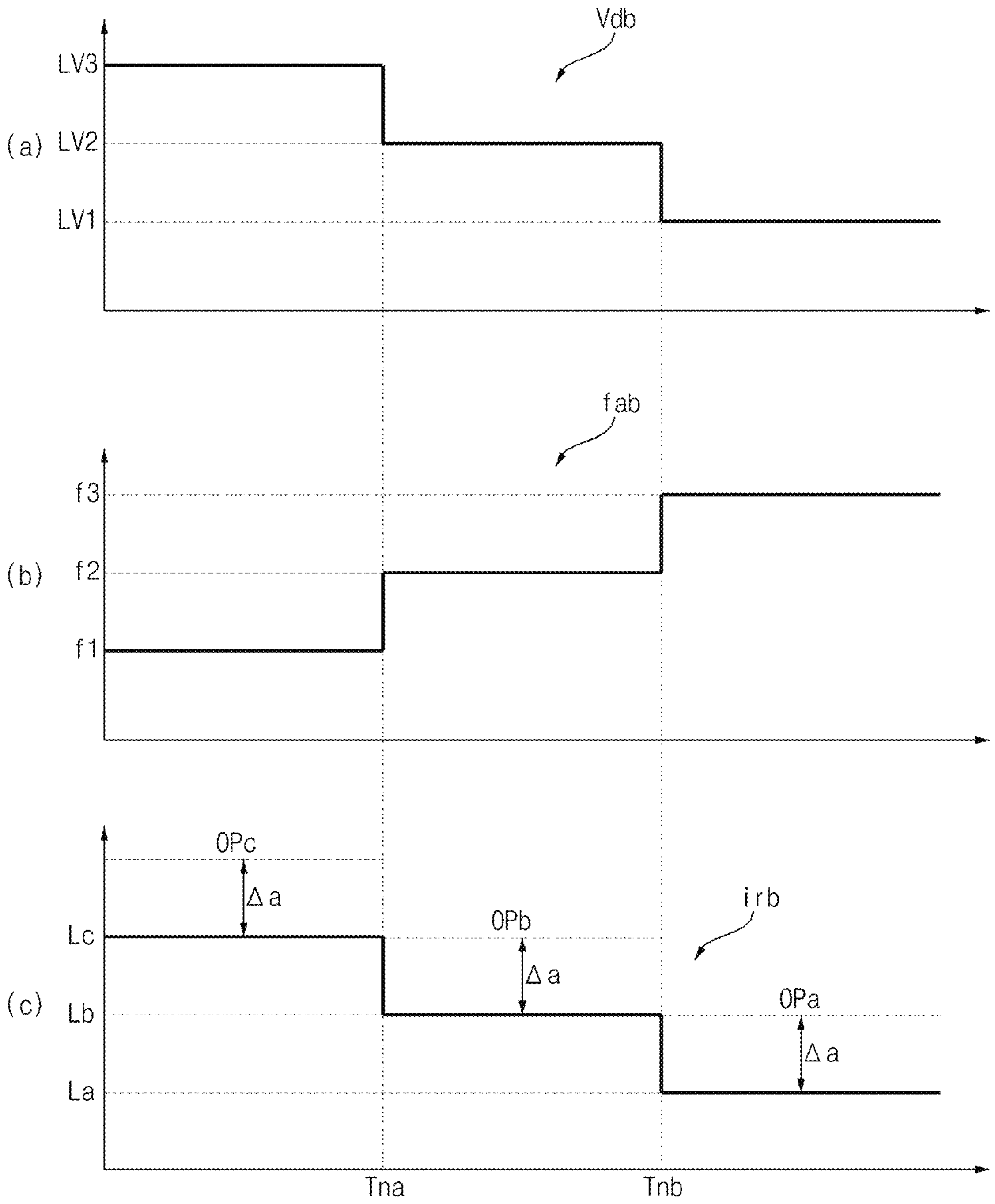

FIG. 12B is a diagram illustrating another example of the operation of a converter according to an embodiment of the present disclosure.

Referring to the drawing, (a) of FIG. 12B illustrates a display driving voltage waveform Vdb.

The converter 910 may output a display driving voltage of a third level LV3 based on the third mode, may output a display driving voltage of a second level LV2 based on the second mode after a time point Tna, and may output a display driving voltage of a first level LV2, which is lower than the second level LV2, based on the first mode after a time point Tnb.

In FIG. 12B, (b) illustrates a switching frequency waveform fab of the first switching element SW1 and the second switching element SW2.

Meanwhile, the switching controller 925 may vary the switching frequency of the first switching element SW1 and the second switching element SW2 according to the level of the display driving voltage.

For example, if the level of a display driving voltage decreases, the switching controller 925 may increase the switching frequency of the first switching element SW1 and the second switching element SW2.

Accordingly, when outputting the display driving voltage of the third level LV3 based on the third mode, the switching controller 925 may control the first switching element SW1 or the second switching element SW2 to switch to a first frequency f1.

Meanwhile, when outputting the display driving voltage of the second level LV2 based on the second mode after the time point Tna, the switching controller 925 may control the first switching element SW1 or the second switching element SW2 to switch to a second frequency f2 which is higher than the first frequency f1.

Meanwhile, when outputting the display driving voltage of the first level LV1 based on the first mode after the time point Tnb, the switching controller 925 may control the first switching element SW1 or the second switching element SW2 to switch to a third frequency f3 which is higher than the second frequency f2.

Referring to FIG. 12B, in comparison with FIG. 12A, the converter 910 may further output a display driving voltage Vdd of the third level LV3 based on the third mode.

Accordingly, the switching controller 925 in the converter 910 may change the reference level for overcurrent protection based on the first mode, the second mode, or the third mode.

Particularly, the second reference level OPb for overcurrent protection in the second mode may be lower than a third reference level OPc for overcurrent protection in the third mode. Accordingly, even when the level of the display driving voltage Vdd changes, heat generated by the circuit elements of the converter 910 may be reduced.

In FIG. 12B, (c) illustrates a reference level for overcurrent in the converter 910.

Meanwhile, the switching controller 925 may set a reference level for overcurrent of the current ir flowing through the resonant inductor LR, based on the first mode, the second mode, and the third mode, respectively.

In the drawing, an example is illustrated in which a reference level for overcurrent of the current ir flowing through the resonant inductor Lr is set to the first reference level OPa in the first mode, the second reference level OPb, which is higher than the first reference level OPa, in the second mode, and the third reference level OPc, which is higher than the second reference level OPb, in the third mode.

Accordingly, when the converter 910 operates in the third mode, the current ir flowing through the resonant inductor Lr may be at a level Lc, in which case a difference between the level Lc and the third reference level OPc may be Δa.

Meanwhile, if the converter 910 operates in the second mode after the time point Tna, the current ir flowing through the resonant inductor Lr may be at a level Lb, in which case a difference between the level Lb and the second reference level OPb may be equal to Δa or almost similar to Δa.

Meanwhile, if the converter 910 operates in the first mode after the time point Tnb, the current ir flowing through the resonant inductor Lr may be at a level La, in which case a difference between the level La and the first reference level OPa may be equal to Δa or almost similar to Δa.

Accordingly, even when the converter 910 operates in each of the first mode or the second mode or the third mode, a difference between the level of the current ir flowing through the resonant inductor Lr and the variable reference level OPa or OPb or OPc remains the same or almost constant, such that overcurrent protection may be stably performed.

Further, the possibility of burnout of the circuit elements in the converter 910 may be significantly reduced, and particularly the possibility of burnout of the transformer 805 may be significantly reduced.

Figure 12C:
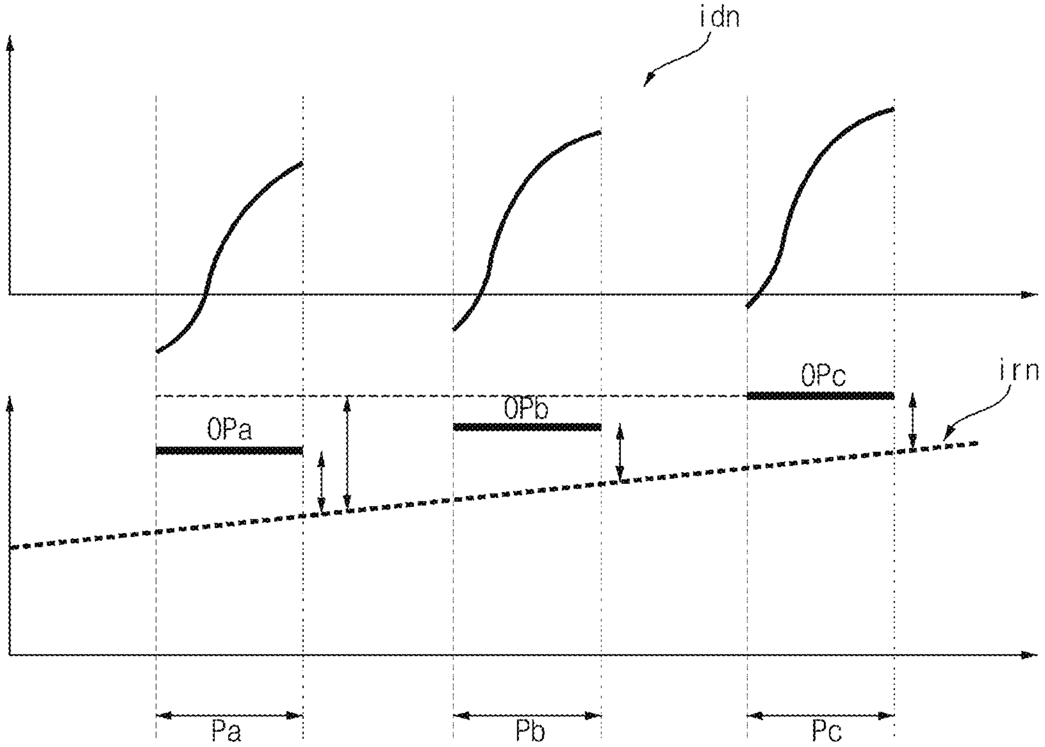

FIG. 12C is a diagram illustrating a current flowing through the second switching element in the first to third modes, and an overcurrent reference level for each of the modes.

Referring to the drawing, icn denotes a waveform of current flowing through the second switching element in the first to third modes, and irn denotes a level of current irn flowing through the resonant inductor Lr.

Meanwhile, the switching controller 925 may change the reference level for overcurrent protection based on the first mode, the second mode, or the third mode.

Meanwhile, the switching controller 925 may control the second reference level OPb for overcurrent protection in the second mode to be lower than the third reference level OPc for overcurrent protection in the third mode.

For example, if the display driving voltage of the first level LV1 is output in the first mode during a first period Pa, the switching controller 925 may set the first reference level OPa as a level of overcurrent protection.

Meanwhile, if the display driving voltage of the second level LV2 is output in the second mode during a second period Pa, the switching controller 925 may set the second reference level OPb, which is higher than the first reference level OPa, as a level of overcurrent protection.

Meanwhile, if the display driving voltage of the third level LV3 is output in the third mode during a third period Pa, the switching controller 925 may set the third reference level OPc, which is higher than the second reference level OPb, as a level of overcurrent protection.

That is, the second reference level OPb for overcurrent protection in the second mode may be lower than the third reference level OPc for overcurrent protection in the third mode.

As illustrated herein, by changing the reference level as the level of overcurrent protection according to the modes or the display driving voltage levels, without fixing the reference level at the third reference level OPc, heat generated by the circuit elements in the converter 910 may be reduced even when the level of the display driving voltage Vdd changes.

Meanwhile, if the current flowing through the resonant inductor Lr in the third mode is at a level higher than or equal to the third reference level OPc which is higher than the second reference level OPb, the switching controller 925 may control the first switching element SW1 and the second switching element SW2 to stop a switching operation. Accordingly, overcurrent protection may be performed in the third mode.

Meanwhile, if the current flowing through the resonant inductor Lr in the first mode is a first current at a level higher than or equal to the first reference level OPa, the switching controller 925 may control the first switching element SW1 and the second switching element SW2 to stop a switching operation, and if the current ir flowing through the resonant inductor Lr in the second mode is the first current at a level between the first reference level OPa and the second reference level OPb higher than the first reference level OPa, the switching controller 925 may control the first switching element SW1 or the second switching element SW2 to perform a switching operation.

That is, based on the level of the current ir flowing through the resonant inductor Lr, an overcurrent protection operation may be performed, or an operation of outputting the display driving voltage may be performed instead of the overcurrent protection operation.

Meanwhile, if the current flowing through the resonant inductor Lr in the second mode is a second current at a level higher than or equal to the first reference level OPa, the switching controller 925 may control the first switching element SW1 and the second switching element SW2 to stop a switching operation, and if the current flowing through the resonant inductor Lr in the third mode is the second current at a level between the second reference level OPb and the third reference level OPc higher than the second reference level OPb, the switching controller 925 may control the first switching element SW1 and the second switching element SW2 to perform a switching operation. Accordingly, an overcurrent protection operation or an operation of outputting the display driving voltage may be selectively performed.

While an example of varying the reference level for overcurrent protection is described based on the operation of the switching controller 925 in FIGS. 11 to 12C, the reference level is not limited thereto, and may be varied by using a separate circuit.

Figure 13A:
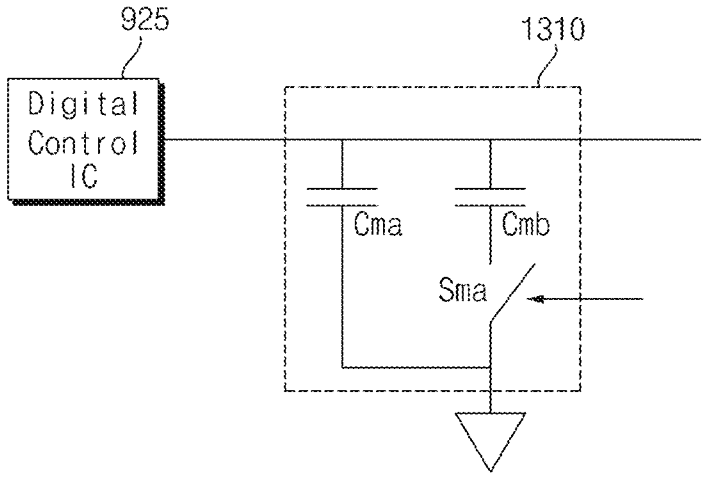

FIG. 13A is a diagram illustrating an example of a reference level changing part for changing a reference level based on a display driving voltage Vdd.

Referring to the drawing, the converter 910 according to an embodiment of the present disclosure may further include a voltage detector 945 configured to detect a display driving voltage Vdd output from an output terminal of the transformer 805, and a reference level changing part 1310 configured to change a reference level based on the display driving voltage Vdd from the voltage detector 945.

Meanwhile, the reference level changing part 1310 according to an embodiment of the present disclosure may include a first capacitor Cma and a second capacitor Cmb which are connected in parallel with each other, and a switching element Sma connected to either the first capacitor Cma or the second capacitor Cmb.

In the drawing, an example is illustrated in which the switching element Sma is disposed between the second capacitor Cmb and the ground terminal.

When the switching element Sma is turned on, the capacitance of the reference level changing part 1310 is obtained as Cma+Cmb, and the RC time constant based on the capacitance is proportional to Cma+Cmb.

Meanwhile, if the switching element Sma is turned off, the capacitance of the reference level changing part 1310 is obtained as Cma, and the RC time constant based on the capacitance is proportional to Cma.

Based on a difference between the Rc time constants, the reference level changing part 1310 may be configured to change the reference level to the first reference level or the second reference level in the first mode or the second mode.

Figure 13B:
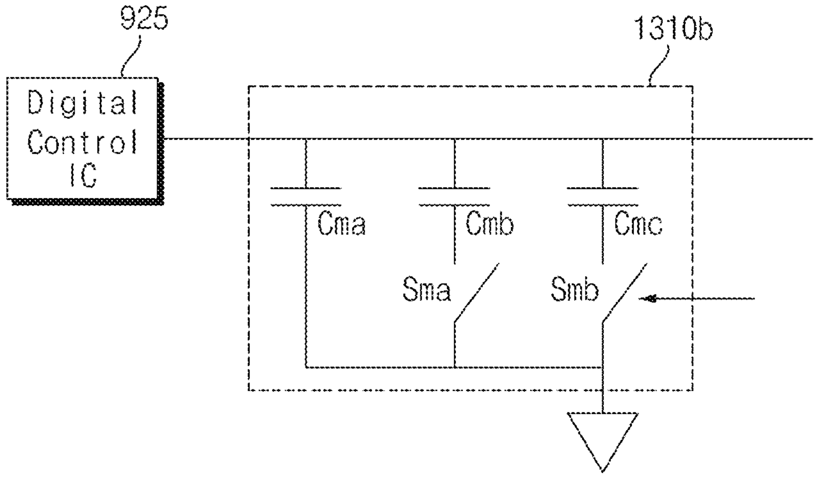

FIG. 13B is a diagram illustrating another example of a reference level changing part for changing a reference level based on a display driving voltage Vdd.

Referring to the drawing, the reference level changing part 1310 according to another embodiment of the present disclosure may include a first capacitor Cma, a second capacitor Cmb, and a third capacitor Cmc which are connected in parallel with each other, a first switching element Sma connected to the second capacitor Cmb, and a second switching element Smb connected to the third capacitor Cmc.

When the first switching element Sma and the second switching element Smb are turned on, the capacitance of the reference level changing part 1310 is obtained as Cma+Cmb+Cmc, and the RC time constant based on the capacitance is proportional to Cma+Cmb+Cmc.

Meanwhile, if the first switching element Sma is turned on and the second switching element Smb is turned off, the capacitance of the reference level changing part 1310 is obtained as Cma+Cmb, and the RC time constant based on the capacitance is proportional to Cma+Cmb.

Meanwhile, if the first switching element Sma and the second switching element Smb are turned off, the capacitance of the reference level changing part 1310 is obtained as Cma, and the RC time constant based on the capacitance is proportional to Cma.

Based on a difference between the Rc time constants, the reference level changing part 1310 may change the reference level to the first reference level, the second reference level, or the third reference level in the first mode, the second mode, or the third mode.

As described above, an image display apparatus according to an embodiment of the present disclosure includes: a display; a signal processing device configured to output an image signal to the display; and a power supply including a converter configured to supply a display driving voltage to the display, wherein the converter is configured to: output a display driving voltage of a first level based on a first mode; output a display driving voltage of a second level higher than the first level based on a second mode; and change a reference level for overcurrent protection based on the first mode or the second mode. Accordingly, heat generated by circuit elements in the converter may be reduced. Particularly, even when the level of the display driving voltage changes, heat generated by circuit elements in the converter may be reduced.

Meanwhile, a first reference level for overcurrent protection in the first mode may be lower than a second reference level for overcurrent protection in the second mode. Accordingly, even when the level of the display driving voltage changes, heat generated by circuit elements in the converter may be reduced.

Meanwhile, the converter may include: a transformer: a first switching element and a second switching element disposed at an input terminal of the transformer and connected in series with each other; a resonant capacitor and a resonant inductor disposed between and respectively connected to the input terminal of the transformer and the second switching element; and a switching controller configured to control the first switching element and the second switching element, wherein the switching controller may be configured to change a reference level for overcurrent protection based on the first mode or the second mode. Accordingly, even when the level of the display driving voltage changes, heat generated by circuit elements in the converter may be reduced.

Meanwhile, the switching controller may be configured to control the first reference level for overcurrent protection in the first mode to be lower than the second reference level for overcurrent protection in the second mode. Accordingly, even when the level of the display driving voltage changes, heat generated by circuit elements in the converter may be reduced.

Meanwhile, the switching controller may be configured to: in the first mode, in response to a current flowing through the resonant inductor being higher than or equal to the first reference level, control the first switching element and the second switching element to stop a switching operation; and in the second mode, in response to a current flowing through the resonant inductor being higher than or equal to the second reference level which is higher than the first reference level, control the first switching element and the second switching element to stop a switching operation. Accordingly, even when the level of the display driving voltage changes, heat generated by circuit elements in the converter may be reduced.

Meanwhile, the switching controller may be configured to: in the first mode, in response to a current flowing through the resonant inductor being a first current at a level higher than or equal to the first reference level, control the first switching element and the second switching element to stop a switching operation; and in the second mode, in response to a current flowing through the resonant inductor being the first current at a level between the first reference level and the second reference level higher than the first reference level, control the first switching element or the second switching element to perform a switching operation. Accordingly, even when the level of the display driving voltage changes, heat generated by circuit elements in the converter may be reduced.

Meanwhile, the switching controller may be configured to: in the first mode, in response to a current flowing through the resonant inductor being higher than or equal to the first reference level, control the first switching element and the second switching element to stop a switching operation for a first period of time; and in the second mode, in response to a current flowing through the resonant inductor being higher than or equal to the second reference level which is higher than the first reference level, control the first switching element and the second switching element to stop a switching operation for a second period of time which is longer than the first period of time. Accordingly, even when the level of the display driving voltage changes, heat generated by circuit elements in the converter may be reduced.

Meanwhile, the converter may further include a current detector configured to detect the current flowing through the resonant inductor. Accordingly, heat generated by circuit elements in the converter may be reduced based on the current flowing through the resonant inductor.

Meanwhile, the converter may further include a voltage detector configured to detect the display driving voltage output from an output terminal of the transformer, wherein the switching controller is configured to change the reference level for overcurrent protection based on a level of the display driving voltage from the voltage detector. Accordingly, even when the level of the display driving voltage changes, heat generated by circuit elements in the converter may be reduced.

Meanwhile, the switching controller may be configured to: in response to a level of the display driving voltage from the voltage detector corresponding to the first level, set the first reference level for overcurrent protection; and in response to a level of the display driving voltage from the voltage detector corresponding to the second level, set the second reference level for overcurrent protection which is higher than the first reference level. Accordingly, even when the level of the display driving voltage changes, heat generated by circuit elements in the converter may be reduced.

Meanwhile, the converter may be configured to output a display driving voltage of a third level based on a third mode, wherein the converter may be configured to change the reference level for overcurrent protection based on the first mode, the second mode, or the third mode. Accordingly, even when the level of the display driving voltage changes, heat generated by circuit elements in the converter may be reduced.

Meanwhile, the second reference level for overcurrent protection in the second mode may be lower than a third reference level for overcurrent protection in the third mode. Accordingly, even when the level of the display driving voltage changes, heat generated by circuit elements in the converter may be reduced.

Meanwhile, the converter may include: a transformer; a first switching element and a second switching element disposed at an input terminal of the transformer and connected in series with each other; a resonant capacitor and a resonant inductor disposed between and respectively connected to the input terminal of the transformer and the second switching element; and a switching controller configured to control the first switching element and the second switching element, wherein the switching controller may be configured to change a reference level for overcurrent protection based on the first mode, the second mode, or the third mode. Accordingly, even when the level of the display driving voltage changes, heat generated by circuit elements in the converter may be reduced.

Meanwhile, the switching controller may be configured to control the second reference level for overcurrent protection in the second mode to be lower than the third reference level for overcurrent protection in the third mode. Accordingly, even when the level of the display driving voltage changes, heat generated by circuit elements in the converter may be reduced.

Meanwhile, the switching controller may be configured to: in the first mode, in response to a current flowing through the resonant inductor being higher than or equal to the first reference level, control the first switching element and the second switching element to stop a switching operation; in the second mode, in response to a current flowing through the resonant inductor being higher than or equal to the second reference level which is higher than the first reference level, control the first switching element and the second switching element to stop a switching operation; and in the third mode, in response to a current flowing through the resonant inductor being higher than or equal to the third reference level which is higher than the second reference level, control the first switching element and the second switching element to stop a switching operation. Accordingly, even when the level of the display driving voltage changes, heat generated by circuit elements in the converter may be reduced.

Meanwhile, the switching controller may be configured to: in the first mode, in response to a current flowing through the resonant inductor being a first current at a level higher than or equal to the first reference level, control the first switching element and the second switching element to stop a switching operation; and in the second mode, in response to a current flowing through the resonant inductor being the first current at a level between the first reference level and the second reference level higher than the first reference level, control the first switching element or the second switching element to perform a switching operation. Accordingly, even when the level of the display driving voltage changes, heat generated by circuit elements in the converter may be reduced.

Meanwhile, the switching controller may be configured to: in the second mode, in response to a current flowing through the resonant inductor being a second current at a level higher than or equal to the first reference level, control the first switching element and the second switching element to stop a switching operation; in the third mode, in response to a current flowing through the resonant inductor being the second current at a level between the second reference level and the third reference level higher than the second reference level, control the first switching element or the second switching element to perform a switching operation. Accordingly, even when the level of the display driving voltage changes, heat generated by circuit elements in the converter may be reduced.

Meanwhile, the converter may further include a voltage detector configured to detect the display driving voltage output from an output terminal of the transformer; and a reference level changing part configured to change a reference level based on the display driving voltage from the voltage detector, wherein the reference level changing part may include: a first capacitor and a second capacitor which are connected in parallel with each other; and a switching element connected to either the first capacitor or the second capacitor.

Accordingly, even when the level of the display driving voltage changes, heat generated by circuit elements in the converter may be reduced.

Meanwhile, the converter may be configured to: in the first mode, in response to a current flowing through the resonant inductor being a first current at a level higher than or equal to the first reference level, control the first switching element and the second switching element to stop a switching operation; and in the second mode, in response to a current flowing through the resonant inductor being the first current at a level between the first reference level and the second reference level higher than the first reference level, control the switching element in the converter to perform a switching operation. Accordingly, even when the level of the display driving voltage changes, heat generated by circuit elements in the converter may be reduced.

An image display apparatus according to another embodiment of the present disclosure includes: a display; a signal processing device configured to output an image signal to the display; and a power supply including a converter configured to supply a display driving voltage to the display, wherein the converter is configured to: in a first mode in which a display driving voltage of a first level is output, in response to a current flowing through a resonant inductor in the converter being a first current at a level higher than or equal to a first reference level, control the switching element in the converter to stop a switching operation; and in a second mode in which a display driving voltage of a second level higher than the first level is output, in response to a current of the resonant inductor being the first current at a level between the first reference level and a second reference level higher than the first reference level, control the switching element in the converter to perform a switching operation. Accordingly, heat generated by circuit elements in the converter may be reduced. Particularly, even when the level of the display driving voltage changes, heat generated by circuit elements in the converter may be reduced.

It will be apparent that, although the preferred embodiments have been illustrated and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure.

What is claimed is:

1. An image display apparatus comprising:

a display;

a signal processing device configured to output an image signal to the display; and a power supply including a converter configured to supply a display driving voltage to the display, wherein the converter is configured to:

output a display driving voltage of a first level based on a first mode;

output a display driving voltage of a second level higher than the first level based on a second mode; and change a reference level for overcurrent protection of the converter based on the first mode or the second mode, wherein the converter comprises:

a transformer:

a first switching element and a second switching element disposed at an input terminal of the transformer, wherein the first switching element and the second switching element are connected in series;

a resonant capacitor and a resonant inductor disposed between, and respectively connected to, the input terminal of the transformer and the second switching element;

a current detector disposed between the second switching element and resonant inductor, and configured to detect a current flowing through the resonant inductor; and a voltage detector configured to detect the display driving voltage output from an output terminal of the transformer, a switching controller configured to:

control the first switching element and the second switching element; and change the reference level for the overcurrent protection based on the first mode or the second mode, wherein the switching controller is further configured to change the reference level for overcurrent protection based on the detected display driving voltage output from the voltage detector or the detected current from the current detector.

2. The image display apparatus of claim 1, wherein a first reference level for the overcurrent protection in the first mode is lower than a second reference level for the overcurrent protection in the second mode.

3. The image display apparatus of claim 1, wherein the switching controller is further configured to control a first reference level for the overcurrent protection in the first mode to be lower than a second reference level for the overcurrent protection in the second mode.

4. The image display apparatus of claim 1, wherein the switching controller is further configured to:

in the first mode, control the first switching element and the second switching element to stop a switching operation, in response to a current flowing through the resonant inductor being higher than or equal to a first reference level; and in the second mode, control the first switching element and the second switching element to stop a switching operation, in response to the current flowing through the resonant inductor being higher than or equal to a second reference level, which is higher than the first reference level.

5. The image display apparatus of claim 1, wherein the switching controller is further configured to:

in the first mode, control the first switching element and the second switching element to stop a switching operation, in response to a current flowing through the resonant inductor being a first current at a level higher than or equal to a first reference level; and in the second mode, control the first switching element or the second switching element to perform a switching operation, in response to the current flowing through the resonant inductor being the first current at a level between the first reference level and a second reference level higher than the first reference level.

6. The image display apparatus of claim 1, wherein the switching controller is configured to:

in the first mode, control the first switching element and the second switching element to stop a switching operation for a first period of time, in response to a current flowing through the resonant inductor being higher than or equal to a first reference level; and in the second mode, control the first switching element and the second switching element to stop a switching operation for a second period of time which is longer than the first period of time, in response to the current flowing through the resonant inductor being higher than or equal to a second reference level which is higher than the first reference level.

7. The image display apparatus of claim 1, wherein the switching controller is further configured to:

set a first reference level for the overcurrent protection, in response to a level of the display driving voltage detected by the voltage detector corresponding to the first level; and set a second reference level for the overcurrent protection which is higher than the first reference level, in response to the level of the display driving voltage detected by the voltage detector corresponding to the second level.

8. The image display apparatus of claim 1, wherein the converter is further configured to output a display driving voltage of a third level based on a third mode, wherein the converter is further configured to change the reference level for the overcurrent protection based on the first mode, the second mode, or the third mode.

9. The image display apparatus of claim 8, wherein a second reference level for the overcurrent protection in the second mode is lower than a third reference level for the overcurrent protection in the third mode.

10. The image display apparatus of claim 8, wherein the switching controller is configured to change the reference level for overcurrent protection based on the first mode, the second mode, or the third mode.

11. The image display apparatus of claim 10, wherein the switching controller is further configured to control a second reference level for the overcurrent protection in the second mode to be lower than a third reference level for the overcurrent protection in the third mode.

12. The image display apparatus of claim 10, wherein the switching controller is configured to:

in the first mode, in response to a current flowing through the resonant inductor being higher than or equal to a first reference level, control the first switching element and the second switching element to stop a switching operation;

in the second mode, in response to the current flowing through the resonant inductor being higher than or equal to a second reference level which is higher than the first reference level, control the first switching element and the second switching element to stop a switching operation; and in the third mode, in response to the current flowing through the resonant inductor being higher than or equal to a third reference level which is higher than the second reference level, control the first switching element and the second switching element to stop a switching operation.

13. The image display apparatus of claim 10, wherein the switching controller is further configured to:

in the first mode, control the first switching element and the second switching element to stop a switching operation, in response to a current flowing through the resonant inductor being a first current at a level higher than or equal to a first reference level; and in the second mode, control the first switching element or the second switching element to perform a switching operation, in response to the current flowing through the resonant inductor being the first current at a level between the first reference level and a second reference level higher than the first reference level.

14. The image display apparatus of claim 10, wherein the switching controller is further configured to:

in the second mode, control the first switching element and the second switching element to stop a switching operation, in response to a current flowing through the resonant inductor being a second current at a level higher than or equal to a first reference level; and in the third mode, control the first switching element or the second switching element to perform a switching operation, in response to the current flowing through the resonant inductor being the second current at a level between a second reference level and a third reference level higher than the second reference level.

15. The image display apparatus of claim 1, wherein the converter further comprises a reference level changing part configured to change the reference level based on the display driving voltage detected by the voltage detector, wherein the reference level changing part comprises:

a first capacitor and a second capacitor which are connected in parallel; and a switching element connected to either the first capacitor or the second capacitor.

16. The image display apparatus of claim 1, wherein the converter is further configured to:

in the first mode, control the first switching element and the second switching element to stop a switching operation, in response to a current flowing through the resonant inductor being a first current at a level higher than or equal to a first reference level; and in the second mode, control the switching element in the converter to perform a switching operation, in response to the current flowing through the resonant inductor being the first current at a level between the first reference level and a second reference level higher than the first reference level.

17. An image display apparatus comprising:

a display;

a signal processing device configured to output an image signal to the display; and a power supply including a converter configured to supply a display driving voltage to the display, wherein the converter is configured to:

in a first mode in which a display driving voltage of a first level is output, control a switching element in the converter to stop a switching operation, in response to a current flowing through a resonant inductor in the converter being a first current at a level higher than or equal to a first reference level; and in a second mode in which a display driving voltage of a second level higher than the first level is output, control the switching element in the converter to perform a switching operation, in response to the current of the resonant inductor being the first current at a level between the first reference level and a second reference level higher than the first reference level, wherein the converter comprises:

a transformer:

a first switching element and a second switching element disposed at an input terminal of the transformer, wherein the first switching element and the second switching element are connected in series;

a resonant capacitor and a resonant inductor disposed between, and respectively connected to, the input terminal of the transformer and the second switching element;

a current detector disposed between the second switching element and resonant inductor, and configured to detect a current flowing through the resonant inductor; and a voltage detector configured to detect the display driving voltage output from an output terminal of the transformer, a switching controller configured to:

control the first switching element and the second switching element; and change the first reference level based on the first mode or the second mode, wherein the switching controller is further configured to change the second reference level based on the detected display driving voltage output from the voltage detector or the detected current from the current detector.

* * * * *